US009923660B2

(12) United States Patent

Zhang

(10) Patent No.: US 9,923,660 B2

(45) Date of Patent: Mar. 20, 2018

(54) OPTICAL ADD-DROP MULTIPLEXER AND BRANCHING UNIT

(71) Applicant: Huawei Marine Networks Co., Ltd., Tianjin (CN)

(72) Inventor: Wendou Zhang, Wuhan (CN)

(73) Assignee: Huawei Marine Networks Co., Ltd., Tianjin (CN)

( * ) Notice: Subject to any disclaimer, the term of this patent is extended or adjusted under 35 U.S.C. 154(b) by 0 days.

(21) Appl. No.: 15/197,277

(22) Filed: Jun. 29, 2016

(65) Prior Publication Data

US 2016/0308638 A1 Oct. 20, 2016

Related U.S. Application Data

(63) Continuation of application No. PCT/CN2013/091006, filed on Dec. 31, 2013.

(51) Int. Cl.
*H04J 14/02* (2006.01)

(52) U.S. Cl.
CPC ...... *H04J 14/0204* (2013.01); *H04J 14/0201* (2013.01); *H04J 14/0205* (2013.01); *H04J 14/0206* (2013.01); *H04J 14/0221* (2013.01)

(58) Field of Classification Search
CPC ...................................... H04J 14/0201–14/022
See application file for complete search history.

(56) References Cited

U.S. PATENT DOCUMENTS

2004/0131353 A1 7/2004 Cannon et al.
2006/0239684 A1* 10/2006 Oguma ............... H04J 14/0204 398/83

(Continued)

FOREIGN PATENT DOCUMENTS

CN 101136717 A 3/2008
CN 101141221 A 3/2008

(Continued)

OTHER PUBLICATIONS

Goldstein et al., "Performance Implications of Component Crosstalk in Transparent Lightwave Networks," IEEE Photonics Technology Letters, vol. 6, Issue 5, p. 657-660, Institute of Electrical and Electronics Engineers, New York, New York, (May 1994).

*Primary Examiner* — David Payne
*Assistant Examiner* — Casey Kretzer
(74) *Attorney, Agent, or Firm* — Leydig, Voit & Mayer, Ltd.

(57) ABSTRACT

An optical add-drop multiplexer and a branching unit are provided, where implementation of the optical add-drop multiplexer includes: an optical processing component, a first combining device, a second combining device, and a second scrambler, where the optical processing component includes an input end, a first output end, a second output end, and a third output end; the first output end of the optical processing component is connected to a first input end of the second combining device, and the second output end of the optical processing component is connected an input end of the second scrambler; an output end of the second scrambler is connected to a second input end of the second combining device; and the third output end of the optical processing component is connected to a first input end of the first combining device.

12 Claims, 16 Drawing Sheets

(56) References Cited

U.S. PATENT DOCUMENTS

| | | | | |
|---|---|---|---|---|
| 2011/0135310 | A1 | 6/2011 | Kovsh et al. | |
| 2012/0114335 | A1* | 5/2012 | Marcerou | H04J 14/0227 398/58 |
| 2012/0201543 | A1* | 8/2012 | Inoue | H04B 10/0797 398/83 |
| 2012/0263476 | A1 | 10/2012 | Sabet et al. | |
| 2013/0223837 | A1 | 8/2013 | Zhang | |

FOREIGN PATENT DOCUMENTS

| | | | |
|---|---|---|---|
| CN | 101420286 | A | 4/2009 |
| CN | 102742199 | A | 10/2012 |
| EP | 1511208 | A2 | 3/2005 |

* cited by examiner

OPTICAL ADD-DROP MULTIPLEXER AND BRANCHING UNIT

CROSS-REFERENCE TO RELATED APPLICATIONS

This application is a continuation of International Application No. PCT/CN2013/091006, filed Dec. 31, 2013, which is hereby incorporated by reference in its entirety.

TECHNICAL FIELD

The present invention relates to the field of communications technologies, and in particular, to an optical add-drop multiplexer, and a branching unit.

BACKGROUND

An optical wavelength division multiplexing technology has been maturely applied in the field of submarine fiber optical communication for many years. In some wavelength division submarine cable systems, a branch is provided. For example, the branch is connected to a branch station by using a BU (branching unit). Inside the BU, one or more OADMs (Optical Add-Drop multiplexer) may be included to constitute an optical add-drop multiplexing branching unit (OADM BU). The BU is may also be externally connected to one or more OADMs to implement functions of an OADM BU. In both manners, a part of signals in trunk signals are dropped to a branch station by using an OADM and a new signal is added to the trunk signals from the branch by using the OADM.

For an application environment of an optical add-drop multiplexer (OADM), refer to FIG. 1. In FIG. 1 (in a case of an OADM BU), Stations A, B, and C are three different stations. The Stations A and B are trunk stations, and a volume of signal transmission is large. The Station C is a branch station, and a volume of signal transmission between the Station C and the trunk stations A and B is relatively small. A branch station drops a signal and uploads a signal by using an OADM BU to implement communication with the stations A and B. The RPT (Repeater) in the figure is an optical amplifier of a submarine cable line, Add and Drop on the branch station C respectively represent ports of an add signal and a drop signal. All arrow directions in FIG. 1 are transmission directions of optical signals.

As shown in FIG. 2, FIG. 2 is a schematic diagram of transmission of a signal when it passes through an optical add-drop multiplexer in an OADM BU in FIG. 1. Transmission signals are classified into four types, which respectively are: an Express (express) signal, which is represented by a rectangle filled with horizontal lines, and bears communication from a trunk station to another trunk station; a Drop signal, which is represented by a rectangle filled with oblique lines from the upper right to the lower left, and bears communication from a trunk to a branch; an Add signal, which is represented by a rectangle filled with diagonal squares, and bears communications from a branch to a trunk; and a Loading signal, which is represented by a black rectangle, where the Loading signal is a wave loading signal in a branch, the loading signal is a signal that is used to perform power balancing and bears no service, and power of the loading signal is the same as power of an express signal. Generally, a wavelength of a drop signal is the same as a wavelength of an Add signal. Squares marked with “Input” and “Output” in FIG. 2 are respectively a port through which a trunk signal enters an OADM, and a port through which a trunk signal is output from the OADM.

In FIG. 2, trunk input signals pass through a Splitter and are split into two lines of signals: one line is dropped to a branch, where a branch station selects a drop signal to receive; and the other line passes through a band block filter (BBF), where a drop signal is blocked, and then an express signal is combined with a branch Add signal and a combined signal is output. When a repeater is used in the branch, in order to balance input power of the repeater, a Loading signal is also input together with the branch Add signal. The Loading signal is filtered out by a band pass filter (BPF) in a transmission direction of the add signal, and the Add signal that passes through the band pass filter and the express signal are combined by using a coupler and then output. FIG. 2 shows signals in one transmission direction in an OADM BU. There is also another signal transmission direction that is completely symmetrical to the one transmission direction, and details are not described herein again.

Referring to FIG. 2, express signals may be dropped to a branch, and consequently, an express signal communicated between trunk stations may be intercepted from a branch station. Therefore, eavesdropping cannot be prevented. In order to prevent eavesdropping, a commonly used solution is a solution based on a transmission protocol, where an OTU (optical transponder unit) board adds a security password to an overhead byte in a service frame structure of a to-be-transmitted signal, different security passwords are set for different target stations, and payload data in a frame structure may be read if a security password read by an OTU board of a target station is the same as a security password preset by the OTU board. In this way, an OADM branch station can receive only data of a drop signal.

However, when the solution based on a transmission protocol is used, if the password is cracked or leaked, content of a trunk signal may still be eavesdropped from a branch. Therefore, information security for anti-eavesdropping is not high.

SUMMARY

Embodiments of the present invention provide an optical add-drop multiplexer and a branching unit, which are used to improve an anti-eavesdropping capability and improve information security.

A first aspect of an embodiment of the present invention provides an optical add-drop multiplexer, including:

an optical processing component, a first combining device, a second combining device, and a second scrambler, where the optical processing component includes an input end, a first output end, a second output end, and a third output end; the first combining device includes a first input end, a second input end, and an output end; and the second combining device includes a first input end, a second input end, and an output end;

the first output end of the optical processing component is connected to the first input end of the second combining device, and the second output end of the optical processing component is connected to an input end of the second scrambler; an output end of the second scrambler is connected to the second input end of the second combining device; and the third output end of the optical processing component is connected to the first input end of the first combining device; and trunk signals including an express signal and a drop signal enter the optical processing component from the input end of the optical processing component, and the optical processing component processes the trunk signals into a second drop signal, a first express signal, and a second express signal, where the first express signal and the second express signal are the same as the express signal, and the second drop signal is the same as the drop signal; the second drop signal enters the first input end of the second combining device through first output enda first output end of the optical processing component; the first express signal enters the input end of the second scrambler through second output enda second output end of the optical processing component, the second scrambler scrambles the first express signal that enters the input end of the second scrambler, to obtain a scrambled express signal, and the scrambled express signal enters the second input end of the second combining device through the output end of the second scrambler; the second combining device combines the second drop signal that enters the first input end of the second combining device and the scrambled express signal that enters the second input end of the second combining device, and then outputs a combined signal; and, the second express signal enters the first input end of the first combining device through third output enda third output end of the optical processing component, and the first combining device combines an express signal that enters the first input end of the first combining device and an add signal that is from a branch adding port of the optical add-drop multiplexer and enters the second input end of the first combining device, and then outputs a combined signal.

With reference to an implementation manner of the first aspect, in a first possible implementation manner, the optical processing component includes:

a first coupler, a first optical splitting device, and a first optical selection device, where an input end of the first coupler serves as the input end of the optical processing component, and a first output end and a second output end of the first coupler are connected to an input end of the first optical splitting device and an input end of the first optical selection device respectively; a first output end of the first optical splitting device is the first output end of the optical processing component, and a second output end of the first optical splitting device is the second output end of the optical processing component; and an output end of the first optical selection device is the third output end of the optical processing component; and the trunk signals including the express signal and the drop signal enter the first coupler from the input end of the first coupler, and the first coupler separates the trunk signals into a first trunk signal and a second trunk signal, where the first trunk signal and the second trunk signal are the same as the trunk signals; the first trunk signal enters the input end of the first optical splitting device through the first output end of the first coupler; the first optical splitting device separates the first trunk signal that enters the input end of the first optical splitting device into the second drop signal and the express signal, where the second drop signal is the same as the drop signal, the second drop signal is output from the first output end of the first optical splitting device, and the express signal is output from the second output end of the first optical splitting device; and the second trunk signal enters the input end of the first optical selection device through the second output end of the first coupler, the first optical selection device blocks the second drop signal in the trunk signals to obtain the express signal, and the obtained express signal is output from the output end of the first optical selection device.

With reference to an implementation manner of the first aspect, in a second possible implementation manner, the optical processing component includes:

a second coupler and a second optical splitting device, where an input end of the second optical splitting device serves as the input end of the optical processing component, a first output end of the second optical splitting device serves as the first output end of the optical processing component, and a second output end of the second optical splitting device is connected to an input end of the second coupler; and a first output end of the second coupler serves as the second output end of the optical processing component, and a second output end of the second coupler serves as the third output end of the optical processing component; and the trunk signals including the express signal and the drop signal enter the second optical splitting device from the input end of the second optical splitting device, the second wavelength division multiplexer separates the trunk signals that enter the input end of the second optical splitting device into the drop signal and the express signal, where the drop signal is output from the first output end of the second optical splitting device, and the express signal enters the input end of the second coupler through the second output end of the second optical splitting device; and the second coupler processes the express signal that enters the second coupler into a first express signal and a second express signal, where the first express signal and the second express signal are the same as the express signal, the first express signal is output from first output enda first output end of the second coupler, and the second express signal is output from second output enda second output end of the second coupler.

With reference to the second possible implementation manner of the first aspect, in a third possible implementation manner, the optical processing component further includes: an optical attenuator, where an input end of the optical attenuator is connected to the first output end of the second optical splitting device, and an output end of the optical attenuator serves as the first output end of the optical processing component.

With reference to the implementation manner of the first aspect, in a fourth possible implementation manner, the optical processing component further includes a fourth output end, the first combining device further includes a third input end, and the optical add-drop multiplexer further includes a first scrambler, where the fourth output end of the optical processing component is connected to an input end of the first scrambler, and an output end of the first scrambler is connected to the third input end of the first combining device;

the optical processing component further processes the drop signal that is in the trunk signals and enters the optical processing component into a first drop signal, where the first drop signal is the same as the drop signal; the first drop signal enters the first scrambler through the fourth output end of the optical processing component; the first scrambler scrambles the first drop signal that enters the first scrambler, to obtain a scrambled first drop signal; and the scrambled first drop signal enters the third input end of the first combining device through the output end of the first scrambler; and the first combining device further connects the first input end of the first combining device and the third input end of the first combining device to the output end of the first combining device; and the express signal that enters the first input end of the first combining device and a scrambled drop signal that enters a third input end of the optical switching component are output from the output end of the first combining device.

With reference to the fourth possible implementation manner of the first aspect, in a fifth possible implementation manner, the optical processing component includes a third optical splitting device, a fourth coupler, and a fifth coupler, where an input end of the third optical splitting device is a trunk input end, the third optical splitting device includes two output ends, a first output end of the third optical splitting device is connected to an input end of the fourth coupler, and a second output end of the third optical splitting device is connected to an input end of the fifth coupler; the fourth coupler includes a first output end and a second output end, and the fifth coupler includes a first output end and a second output end; the first output end of the fourth coupler is connected, as the third output end of the optical processing component, to the first input end of the first combining device; the second output end of the fourth coupler is connected, as the second output end of the optical processing component, to the input end of the second scrambler; the first output end of the fifth coupler is connected, as the fourth output end of the optical processing component, to the first scrambler; the second output end of the fifth coupler is connected, as the first output end of the optical processing component, to the first input end of the second combining device; and the output end of the first scrambler is connected to the third input end of the optical switching component; and the trunk signals including the express signal and the drop signal enter the third optical splitting device from the input end of the third optical splitting device, the third optical splitting device splits the trunk signals into the express signal and the drop signal, the express signal enters the input end of the fourth coupler through the first output end of the third optical splitting device, and the drop signal enters the input end of the fifth coupler through the second output end of the third optical splitting device; the fourth coupler processes the express signal that enters the input end of the fourth coupler into the first express signal and the second express signal, where the first express signal and the second express signal are the same as the express signal; the first express signal enters the first input end of the first combining device through the first output end of the fourth coupler, and the second express signal enters the input end of the second scrambler through the second output end of the fourth coupler; the fifth coupler processes the drop signal that enters the input end of the fifth coupler into the first drop signal and the second drop signal, where the first drop signal and the second drop signal are the same as the drop signal; and the first drop signal enters the input end of the first scrambler through the first output end of the fifth coupler, and the second drop signal enters the first input end of the second combining device through the second output end of the fifth coupler.

With reference to the fourth possible implementation manner of the first aspect, in a sixth possible implementation manner, branch signals include a loading signal and an add signal, the add-drop multiplexing branching unit further includes a fourth optical splitting device, and the first combining device further includes a fourth input end, where a first output end of the fourth optical splitting device is connected to the fourth input end of the first combining device, and a second output end of the fourth optical splitting device is connected to the second input end of the first combining device;

the branch signals including the loading signal and the add signal enter the fourth optical splitting device from an input end of the fourth optical splitting device, the fourth optical splitting device splits the branch signals that enter the fourth optical splitting device into the loading signal and the add signal, the loading signal enters a fourth input end of the optical switching component through the first output end of the fourth optical splitting device, and the add signal enters a second input end of the optical switching component through the second output end of the fourth optical splitting device; and the first combining device further connects the second input end and the fourth input end to the output end of the first combining device, and a loading signal that enters the fourth input end of the first combining device and an add signal that enters the fourth input end of the first combining device are output from the output end of the first combining device.

With reference to the first, the second, the third, the fourth, the fifth, or the sixth possible implementation manner of the first aspect, in a seventh possible implementation manner, the add-drop multiplexing branching unit further includes a first band block filter or a first wavelength blocker, where the first band block filter or the first wavelength blocker is connected in series between the optical processing component and the first input end of the first combining device, and is configured to block a drop signal among express signals that passes through the first band block filter or the first wavelength blocker.

With reference to the first, the second, the third, the fourth, the fifth, or the sixth possible implementation manner of the first aspect, in an eighth possible implementation manner, the first optical splitting device is a wavelength division multiplexer or a 1*2 wavelength selective switch; the second optical splitting device is a wavelength division multiplexer or a 1*2 wavelength selective switch; and the first optical selection device is a band block filter or a wavelength blocker.

With reference to the eighth possible implementation manner of the first aspect, in a ninth possible implementation manner, the optical add-drop multiplexer further includes a first optical amplifier, a second optical amplifier, a second optical selection device, a control unit, a first detecting device, and a second detecting device, where the first optical amplifier is connected in series before the input end of the optical processing component, and an output end of the first optical amplifier is connected to the optical processing component; and an output end of the second optical amplifier is connected to an input end of the second optical selection device, an output end of the second optical selection device is connected to an input end of the second detecting device, and an output end of the second detecting device is connected to the second input end of the first combining device;

a trunk signal enters the first optical amplifier from an input end of the first optical amplifier, and enters the input end of the optical processing component through the output end of the first optical amplifier; the branch signals including the loading signal and the add signal enter the second optical amplifier from an input end of the second optical amplifier, and enter the input end of the second optical selection device through the output end of the second optical amplifier; the input end of the second optical selection device blocks the loading signal that is in the branch signals and enters the second optical selection device from the input end of the second optical selection device, to obtain the add signal; and the obtained add signal enters the second input end of the first combining device through the output end of the second optical selection device; and the first detecting device detects an express signal that passes through the first detecting device, and sends a first detection value to the control unit; the control unit adjusts, according to the first detection value, an amplification gain of the first optical amplifier to compensate for an insertion loss of the optical add-drop multiplexer; the second detecting device detects an add signal that passes through the second detecting device, and sends a second detection value to the control unit; and the control unit adjusts, according to the second detection value, an amplification gain of the second optical amplifier to compensate for an insertion loss of the optical add-drop multiplexer.

With reference to the ninth possible implementation manner, in a tenth possible implementation manner, if the first optical splitting device included in the optical processing component is a 1*2 wavelength selective switch, and both the first optical selection device and the second optical selection device are wavelength blockers; then the control unit is further separately connected to the first optical splitting device, the first optical selection device, and the second optical selection device, so as to constitute a reconfigurable OADM.

With reference to the ninth possible implementation manner of the first aspect, in an eleventh implementation manner, the first detecting device includes a third coupler and an optical detector, where the third coupler is connected in series between the optical processing component and the first input end of the first combining device, an input end of the third coupler is connected to the optical processing component, and two output ends of the third coupler are separately connected to the first input end of the first combining device, and the optical detector; and the optical detector is connected to the control unit; and an express signal that enters the third coupler through the output end of the optical processing component is split into two parts, which separately enter the first input end of the first combining device, or the optical detector through the two output ends of the third coupler; and the optical detector detects an express signal that enters the optical detector from an input end of the optical detector, and sends the first detection value to the control unit.

With reference to the implementation manner of the first aspect, the first, the second, the third, the fourth, the fifth, or the sixth possible implementation manner of the first aspect, in a twelfth possible implementation manner, the first scrambler or the second scrambler is a ring oscillator.

With reference to the twelfth possible implementation manner of the first aspect, in a thirteenth possible implementation manner, the ring oscillator includes at least one 2*2 coupler; if the ring oscillator is formed by at least two 2*2 couplers, the at least two 2*2 couplers are connected in a series connection or parallel connection manner; and if the ring oscillator is formed by at least three 2*2 couplers, the at least three 2*2 couplers are connected in a series connection manner, a parallel connection manner, or a series connection and parallel connection manner.

With reference to the thirteenth possible implementation manner of the first aspect, in a fourteenth possible implementation manner, a split ratio of the 2*2 coupler is $$\frac{3-\sqrt{5}}{2}.$$

A second aspect of an embodiment of the present invention further provides a branching unit, where the branching unit includes an optical add-drop multiplexer, and the optical add-drop multiplexer is the optical add-drop multiplexer according to any implementation manner of the first aspect.

As may be seen from the foregoing technical solutions, embodiments of the present invention have the following advantages: An express signal, after being separated by an optical processing component, is scrambled through a second scrambler to obtain a scrambled express signal, and the scrambled express signal and a drop signal are combined and then dropped to a branch. For the branch, the express signal is not transparent at a physical layer. Therefore, the express signal cannot be recovered in the branch, so that an anti-eavesdropping capability is relatively strong, and information security is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the accompanying drawings in all subsequent embodiments, an Express (express) signal, which is represented by a rectangle filled with horizontal lines, bears communication from a trunk to a trunk station; a Drop (drop) signal, which is represented by a rectangle filled with oblique lines from the upper right to the lower left, bears communication from a trunk to a branch; an Add (add) signal, which is represented by a rectangle filled with diagonal squares, bears communication from a branch to a trunk; and a Loading (loading) signal, which is represented by a black rectangle, where the Loading signal is a wave loading signal in a branch, the loading signal is a signal that is used to perform power balancing and bears no service, and power of the loading signal is the same as power of the express signal; an scrambled express signal is an express signal that has been scrambled and is represented by a rectangle filled with dots; and a drop signal is a drop signal that has been scrambled and is represented by a rectangle filled with white dots and a black background. In the accompanying drawings, a direction shown by an arrow is a transmission direction of an optical signal, squares marked with "Input" and "Output" are respectively a port through which a trunk signal enters an OADM, and a port through which a trunk signal is output from the OADM. In the subsequent embodiments, meanings of the squares in the accompanying drawings are not described one by one. All subsequent drawings in the embodiments of the present invention show a transmission direction of an optical signal in one direction, a transmission direction of an optical signal in an opposite direction is mirror-symmetrical to the transmission direction of an optical signal in the one direction, and an internal structure of an optical add-drop multiplexer is also mirror-symmetrical. Therefore, for a structure of the optical add-drop multiplexer in an opposite direction, details are not described again.

Figure 3:
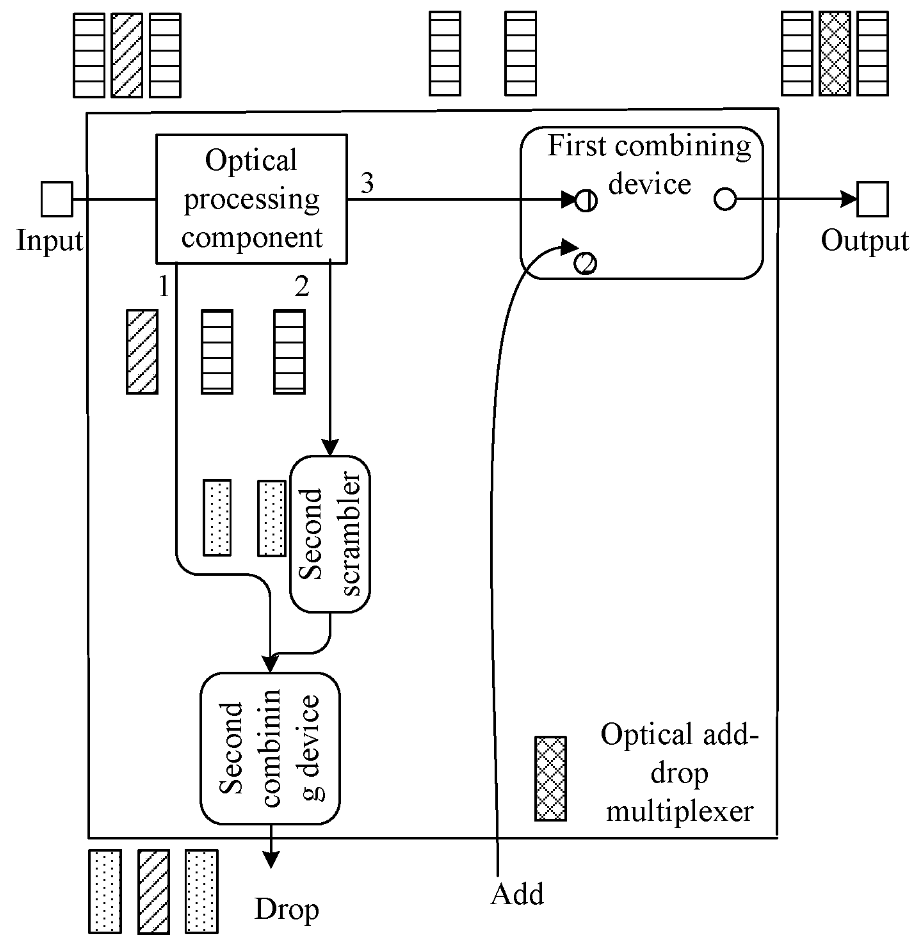
FIG. 3 is a schematic structural diagram of an optical add-drop multiplexer according to an embodiment of the present invention.

An embodiment of the present invention provides an optical add-drop multiplexer. As shown in FIG. 3, the optical add-drop multiplexer includes:

an optical processing component, a first combining device, a second combining device, and a second scrambler.

A connection manner of each device is specifically as follows: The optical processing component includes an input end, a first output end, a second output end, and a third output end (numbers 1 to 3 of three output ends shown in FIG. 3 correspond to the first output end, the second output end, and the third output end respectively; and numbers of output ends of the optical processing component shown in subsequent FIG. 4, FIG. 5, FIG. 6, and FIG. 7 are similar, which are not described one by one in the subsequent embodiments); the first combining device includes a first input end, a second input end, and an output end; and the second combining device includes a first input end, a second input end, and an output end; and the first output end of the optical processing component is connected to the first input end of the second combining device, and the second output end of the optical processing component is connected to an input end of the second scrambler; an output end of the second scrambler is connected to the second input end of the second combining device; and the third output end of the optical processing component is connected to the first input end of the first combining device.

The following describes in detail a transmission direction of optical signals and processing of each device: Trunk signals including the express signal and the drop signal enter the optical processing component from the input end of the optical processing component, and the optical processing component processes the trunk signals into a second drop signal, a first express signal, and a second express signal, where the first express signal and the second express signal are the same as the express signal, and the second drop signal is the same as the drop signal; the second drop signal enters the first input end of the second combining device through first output enda first output end of the optical processing component; the first express signal enters the input end of the second scrambler through second output enda second output end of the optical processing component, the second scrambler scrambles the first express signal that enters the input end of the second scrambler, to obtain a scrambled express signal, and the scrambled express signal enters the second input end of the second combining device through the output end of the second scrambler; the second combining device combines the second drop signal that enters the first input end of the second combining device and the scrambled express signal that enters the second input end of the second combining device, and then outputs a combined signal; and, the second express signal enters the first input end of the first combining device through the third output end of the optical processing component, and the first combining device combines an express signal that enters the first input end of the first combining device and an add signal that is from a branch adding port of the optical add-drop multiplexer and enters the second input end of the first combining device, and then outputs a combined signal.

In addition, it should be noted that there are only Add signals in an add optical path shown in the foregoing FIG. 3, and actually, signals in the path may only be add signals, or may be an add signal and a loading signal that is used to perform power balancing. This embodiment of the present invention does not focus on a specific form of the optical signal in the add optical path; therefore, this embodiment of the present invention may set no limitation on this, and what is shown in FIG. 3 shall not be understood as a limitation on this embodiment of the present invention.

In this embodiment of the present invention, an express signal, after being separated by an optical processing component, is scrambled through a second scrambler to obtain a scrambled express signal; and the scrambled express signal and a drop signal are combined and then dropped to a branch. For the branch, the express signal is not transparent at a physical layer. Therefore, the express signal cannot be recovered in the branch, so that an anti-eavesdropping capability is relatively strong, and information security is improved.

Figure 4:
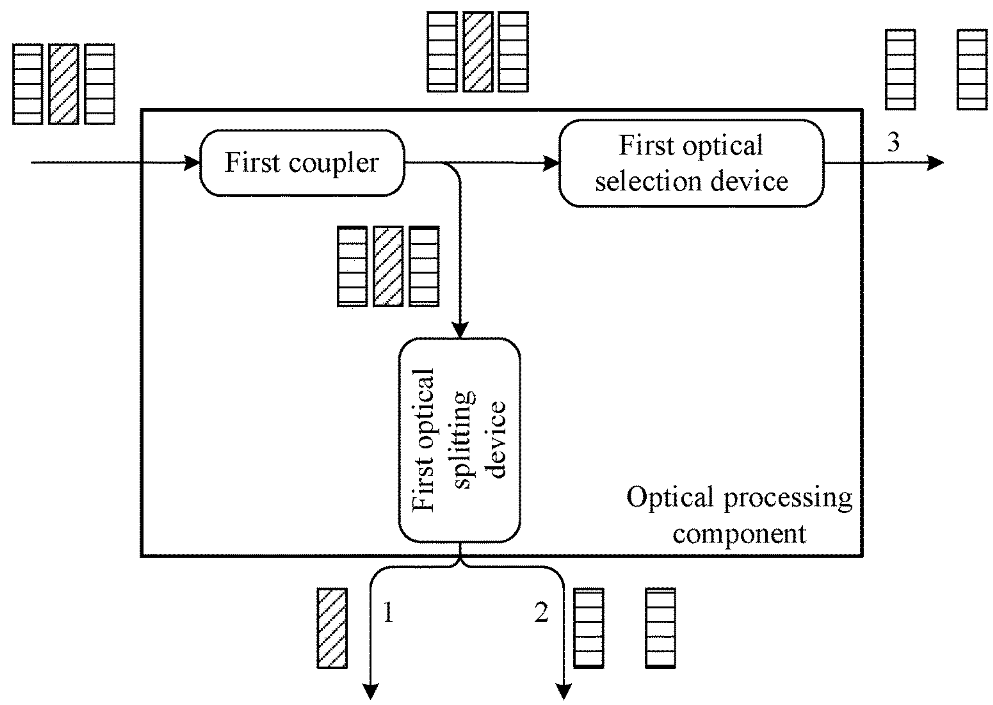
FIG. 4 is a schematic structural diagram of an optical processing component according to an embodiment of the present invention.

The following embodiment provides two solutions to an optical processing component as examples, and exemplary description is as follows:

Solution 1: As shown in FIG. 4, the optical processing component includes a first coupler, a first optical splitting device, and a first optical selection device.

A connection manner of each device is specifically as follows: An input end of the first coupler serves as the input end of the optical processing component, a first output end and a second output end of the first coupler are connected to an input end of the first optical splitting device and an input end of the first optical selection device respectively; a first output end of the first optical splitting device is the first output end of the optical processing component, a second output end of the first optical splitting device is the second output end of the optical processing component; and an output end of the first optical selection device is the third output end of the optical processing component.

The following describes in detail a transmission direction of an optical signal and processing of each device: Trunk signals including the express signal and the drop signal enter the first coupler from the input end of the first coupler, and the first coupler separates the trunk signals into a first trunk signal and a second trunk signal, where the first trunk signal and the second trunk signal are the same as the trunk signals; the first trunk signal enters the input end of the first optical splitting device through the first output end of the first coupler; the first optical splitting device separates the first trunk signal that enters the input end of the first optical splitting device into the second drop signal and the express signal, where the second drop signal is the same as the drop signal, the second drop signal is output from the first output end of the first optical splitting device, and the express signal is output from the second output end of the first optical splitting device; and the second trunk signal enters the input end of the first optical selection device through the second output end of the first coupler, the first optical selection device blocks the second drop signal in the trunk signals to obtain the express signal, and the obtained express signal is output from the output end of the first optical selection device.

In the foregoing embodiment solution, first, trunk signals are separated into two lines of trunk signals, and then processing is separately performed on the two lines of trunk signals to obtain one drop signal and two express signals. Only three devices are needed to complete a function of an optical processing component.

Figure 5:
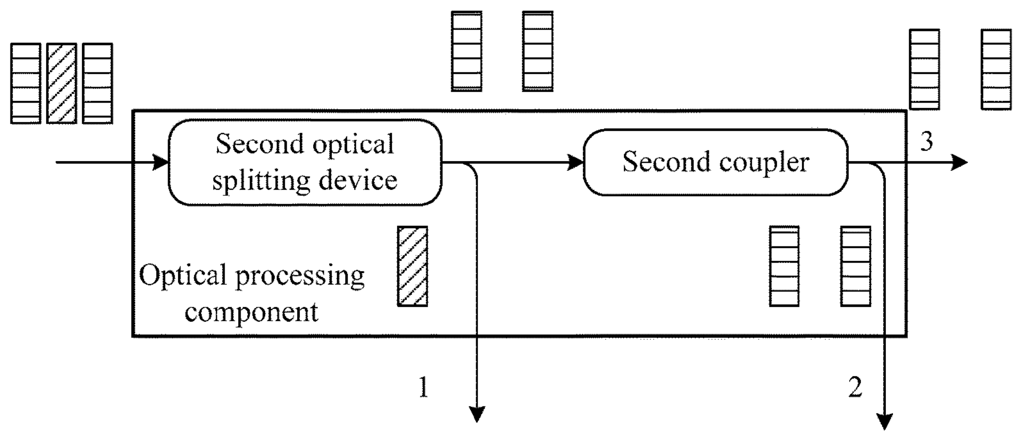
FIG. 5 is a schematic structural diagram of an optical processing component according to an embodiment of the present invention.

Solution 2: As shown in FIG. 5, the optical processing component includes a second coupler and a second optical splitting device.

A connection manner of each device is specifically as follows: An input end of the second optical splitting device serves as the input end of the optical processing component, a first output end of the second optical splitting device serves as the first output end of the optical processing component, and a second output end of the second optical splitting device is connected to an input end of the second coupler; and a first output end of the second coupler serves as the second output end of the optical processing component, and a second output end of the second coupler serves as the third output end of the optical processing component.

The following describes in detail a transmission direction of an optical signal and processing of each device: Trunk signals including the express signal and the drop signal enter the second optical splitting device from the input end of the second optical splitting device, the second wavelength division multiplexer separates the trunk signals that enter the input end of the second optical splitting device into the drop signal and the express signal, where the drop signal is output from the first output end of the second optical splitting device, and the express signal enters the input end of the second coupler through the second output end of the second optical splitting device; and the second coupler processes the express signal that enters the second coupler into a first express signal and a second express signal, where the first express signal and the second express signal are the same as the express signal, the first express signal is output from first output enda first output end of the second coupler, and the second express signal is output from second output enda second output end of the second coupler.

In the foregoing embodiment solution, first, trunk signals are separated into the express signals and the drop signals, and then the express signals are coupled into two lines of identical express signals. Only two devices are needed to complete a function of an optical processing component, and hardware resources can further be saved.

Figure 6:
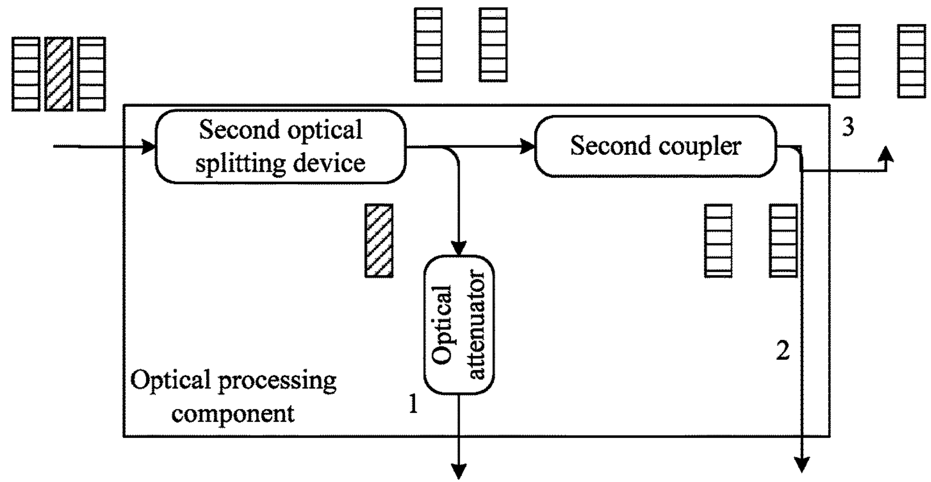
FIG. 6 is a schematic structural diagram of an optical processing component according to an embodiment of the present invention.

As a supplement of solution 2, as shown in FIG. 6, the optical processing component further includes an optical attenuator, where an input end of the optical attenuator is connected to the first output end of the second optical splitting device, and an output end of the optical attenuator serves as the first output end of the optical processing component.

The foregoing optical attenuator is a device that has a function of power adjustment for an optical signal passing through it. In the foregoing solution, with an optical attenuator, power control over a drop signal is implemented, so that an effect of receiving the drop signal is better.

Further, after an optical splitting device splits signals, a small number of drop signals may be mixed among express signals. To further filter out the drop signals that are mixed among the express signals, the add-drop multiplexing branching unit further includes a first band block filter or a first wavelength blocker, where the first band block filter or the first wavelength blocker is connected in series between the optical processing component and the first input end of the first combining device, and is configured to block a drop signal in an express signal that passes through the first band block filter or the first wavelength blocker.

Based on descriptions of the foregoing two optical processing components, more specifically, the first optical splitting device is a wavelength division multiplexer or a 1*2 wavelength selective switch; the second optical splitting device is a wavelength division multiplexer or a 1*2 wavelength selective switch; and the first optical selection device is a band block filter or a wavelength blocker.

Figure 7:
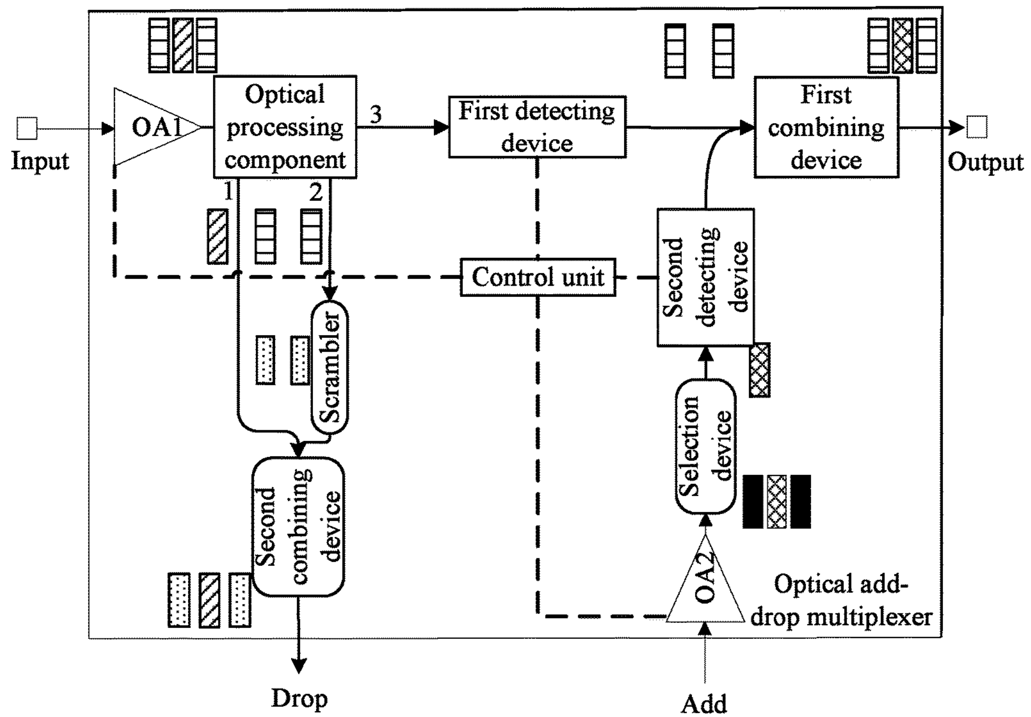
FIG. 7 is a schematic structural diagram of an optical add-drop multiplexer according to an embodiment of the present invention.

To implement management of power balancing between an express signal and an Add signal, an embodiment of the present invention further provides the following solution: As shown in FIG. 7, the optical add-drop multiplexer further includes a first optical amplifier, a second optical amplifier, a second optical selection device, a control unit, a first detecting device, and a second detecting device.

A connection manner of each device is specifically as follows: The first optical amplifier is connected in series before the input end of the optical processing component, and an output end of the first optical amplifier is connected to the optical processing component; and an output end of the second optical amplifier is connected to an input end of the second optical selection device, an output end of the second optical selection device is connected to an input end of the second detecting device, and an output end of the second detecting device is connected to the second input end of the first combining device.

The following describes in detail a transmission direction of an optical signal and processing of each device: A trunk signal enters the first optical amplifier from an input end of the first optical amplifier, and enters the input end of the optical processing component through the output end of the first optical amplifier; branch signals including a loading signal and an add signal enter the second optical amplifier from an input end of the second optical amplifier, and enter the input end of the second optical selection device through the output end of the second optical amplifier; the input end of the second optical selection device blocks the loading signal that is in the branch signals and enters the second optical selection device from the input end of the second optical selection device, to obtain the add signal; and the obtained add signal enters the second input end of the first combining device through the output end of the second optical selection device.

Transmission of a detection signal and a control signal is needed to implement power balancing management. A connection relationship between a controller, and the first detecting device and the second detecting device are represented by dotted lines in FIG. 7, where the dotted lines are used to be differentiated from a solid line representing a transmission direction of an optical signal. Specifically, the first detecting device detects an express signal that passes through the first detecting device, and sends a first detection value to the control unit; the control unit adjusts, according to the first detection value, an amplification gain of the first optical amplifier to compensate for an insertion loss of the optical add-drop multiplexer; the second detecting device detects an add signal that passes through the second detecting device, and sends a second detection value to the control unit; and the control unit adjusts, according to the second detection value, an amplification gain of the second optical amplifier to compensate for an insertion loss of the optical add-drop multiplexer.

In the foregoing embodiment, a control unit, a first detecting device, and a second detecting device are used to implement power balancing between a trunk and a branch. This solution can implement automatic power balancing.

For an implementation solution of implementing power balancing management, if the first optical splitting device included in the optical processing component is a 1*2 wavelength selective switch, and both the first optical selection device and the second optical selection device are wavelength blockers, the control unit is further connected separately to the first optical splitting device, the first optical selection device, and the second optical selection device.

In this embodiment, the foregoing control unit, the first optical splitting device, the first optical selection device, and the second optical selection device form a reconfigurable optical add-drop multiplexer, so as to adjust a drop signal and an add signal.

Figure 8:
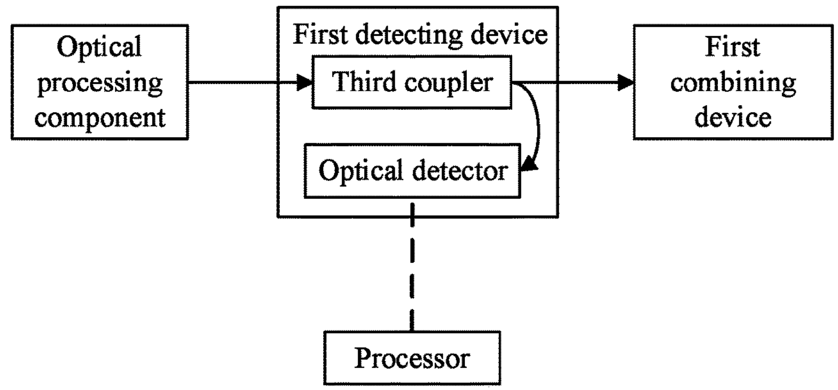
FIG. 8 is a schematic structural diagram of a detecting device according to an embodiment of the present invention.

In an implementation solution of implementing power balancing management, a detecting device needs to be used, and a function implemented by the detecting device is detecting an optical signal that passes through the detecting device and determining power of the optical signal that passes through the detecting device. There are many optional implementation solutions. An embodiment of the present invention provides an example of an implementation solution thereof. As shown in FIG. 8, also referring to FIG. 7, specifically, the first detecting device includes a third coupler and an optical detector.

A connection manner of each device is specifically as follows: The third coupler is connected in series between the optical processing component and the first input end of the first combining device, an input end of the third coupler is connected to the optical processing component, and two output ends of the third coupler are separately connected to the first input end of the first combining device, and the optical detector; and the optical detector is connected to the control unit.

The following describes in detail a transmission direction of an optical signal and a detection value, and processing of each device: An express signal that enters the third coupler through the output end of the optical processing component is split into two parts, which separately enter the first input end of the first combining device or the optical detector through the two output ends of the third coupler; and the optical detector detects an express signal that enters the optical detector from an input end of the optical detector, and sends the first detection value to the control unit.

In the foregoing embodiment, a signal detection function is implemented by using only two devices. The signal detection function can be implemented under the premise of using less hardware.

Optionally, a second scrambler is a device that performs a scrambling operation on an optical signal. An implementation solution thereof provided by this embodiment of the present invention is as follows: The second scrambler is a ring oscillator. An implementation manner of the second scrambler may also be that a coupler and a delay device are used for implementation as follows: The coupler is used to split a to-be-scrambled optical signal into two or more than two signals.

The delay device is used to superimpose different delays in different transmission directions, and then combining is performed to form an M-Z interferometer apparatus. A purpose of co-channel crosstalk is also achieved. This embodiment of the present invention provides a specific implementation solution to forming a ring oscillator based on a 2*2 coupler as follows: The ring oscillator includes at least one 2*2 coupler; if the ring oscillator is formed by at least two 2*2 couplers, the at least two 2*2 couplers are connected in a series connection or parallel connection manner; and if the ring oscillator is formed by at least three 2*2 couplers, the at least three 2*2 couplers are connected in a series connection manner, a parallel connection manner, or a series connection and parallel connection manner.

As an exemplary implementation solution, a split ratio of the 2*2 coupler is $$\frac{3-\sqrt{5}}{2}.$$

The following embodiment provides more detailed description about the solution provided in the foregoing embodiment. In subsequent embodiments, a relatively large number of functional devices are involved, and functions of the devices are described as follows:

A WDM (Wavelength Division Multiplexer, wavelength division multiplexer): generally has at least three ports and is configured to split input light of different wavelengths and output the light through different ports; or combine signal light of different wavelengths that is input from different ports, and then output combined signal light through a same port. That is, only light of a specific wavelength can pass between specified ports.

A WSS (Wavelength Selective Switch, wavelength selective switch): is a multi-port wavelength correlation device and includes at least three ports, and a wavelength connectivity relationship between ports is reconfigurable. For example, the 1*2 WSS involved in the foregoing embodiment may control, by using a command, a part of signals of a specified wavelength among signals input from one port to be output from one port thereof, and another part of signals of another wavelength to be output from another port. Conversely, signals of different wavelengths input from different ports may be combined and then output through one port. Generally, a commercially used WSS device further has an attenuation adjustment function for an optical signal and a port output selection function.

A WB (Wavelength Blocker, wavelength blocker): is a two-port reconfigurable device, and can block, by means of command control, a signal of a specific wavelength that passes through the WB.

A Coupler (coupler): generally has at least three ports, and can split a beam of light into several beams and output the beams through different ports, which is irrelevant to a wavelength. The coupler may also combine signal light input from different ports, and then output combined signal light through one or more ports, where the output light may include a wavelength element input from each input port, that is, light splitting and combination performed by this device is wavelength independent. Technically, the coupler traditionally refers to a multi-input/output wavelength-independent optical power coupling and division device and a low-coupling ratio optical power division device.

A Splitter (splitter): generally has at least three ports, and is a wavelength-independent optical power division device, which is an optional implementation device of a Coupler. In the technical filed, a splitter traditionally refers to an optical power division device that splits an optical signal into several signals of equivalent or comparable powers.

A Combiner (combiner/combiner): is a device that combines several signals together, which is not specifically wavelength dependent or independent, and in a combining function, may be seen as a concept of an upper device of a WDM, a COUPLER, or a WSS device.

A BBF (Band Block Filter, band block filter): is a two-port device that blocks a signal of a specific wave band and allows other signals to pass.

A BPF (Band Pass Filter, band pass filter): is a two-port device that enables a signal of a specific wave band to pass and blocks other signals.

A VOA (Variable Optical Attenuator, variable optical attenuator): is an optical attenuator that can adjust an attenuation volume.

The following provides five optional implementation solutions, which are specifically as follows:

Solution 1

Figure 9:
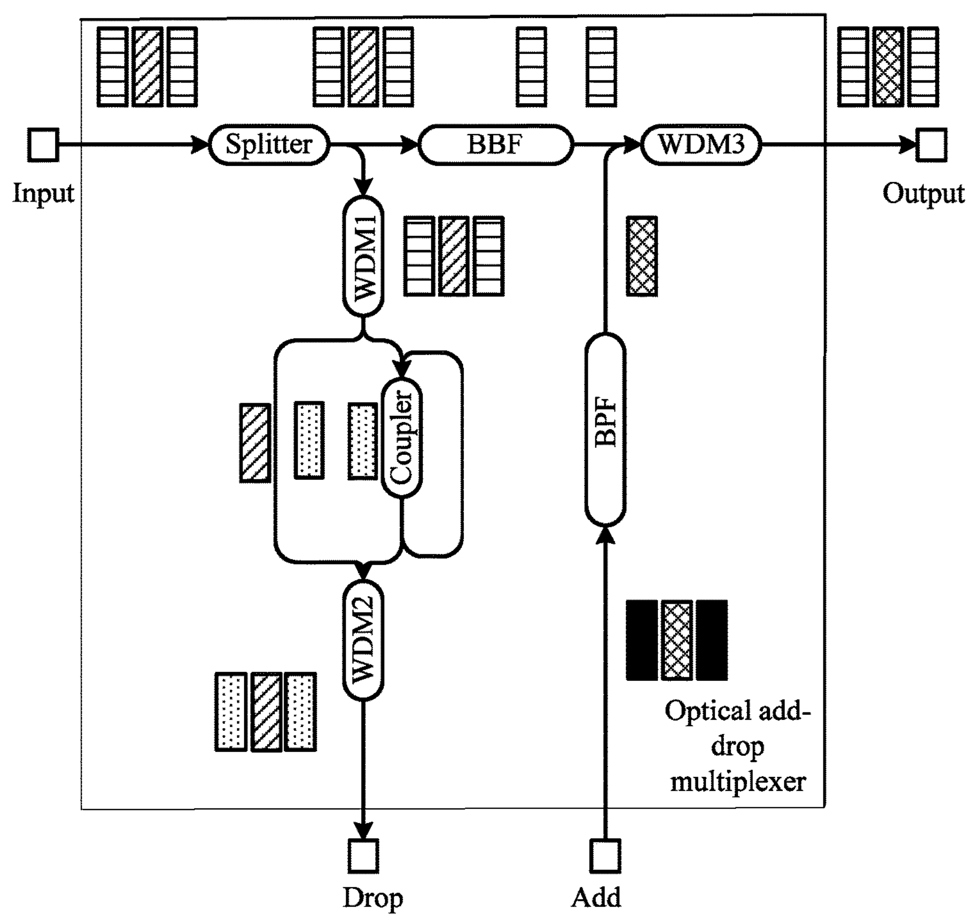
FIG. 9 is a schematic structural diagram of an optical add-drop multiplexer according to an embodiment of the present invention.

A technical solution in the embodiment is shown in FIG. 9. A splitter (Splitter) is used at an input end of an OADM BU apparatus to separate input trunk signals into two lines. In one line of drop signals, a wavelength division multiplexer 1 (WDM1) is used to separate drop signals and express signals. An express signal passes through an input end of a 2*2 coupler (Coupler), where one output end of the 2*2 coupler is connected to another input end to form a ring oscillator in a loopback manner, and another output end of the 2*2 coupler is combined with a drop signal by using a wavelength division multiplexer 2 (WDM2), and a combined signal is output from a drop end. An express signal passes through a band block filter (BBF), and the band block filter blocks a drop signal to obtain the express signal. The express signal passes through a wavelength division multiplexer 3 (WDM3) and is combined with an Add signal, and then a combined signal is output. In one line of drop signals, a Loading (loading) signal is blocked by a band pass filter (BPF) to obtain the Add signal; the Add signal passes through the band pass filter, and then is combined with an express signal by using the wavelength division multiplexer 3 (WDM3); and then a combined signal is output.

In this embodiment of the present invention, an express signal, after being separated by a splitter and a wavelength division multiplexer, is scrambled by a ring oscillator to obtain a scrambled express signal, and the scrambled express signal and a drop signal are combined and then dropped to a branch. For the branch, the express signal is not transparent at a physical layer. Therefore, the express signal cannot be recovered in the branch, so that an anti-eavesdropping capability is relatively strong, and information security is improved.

Figure 10:
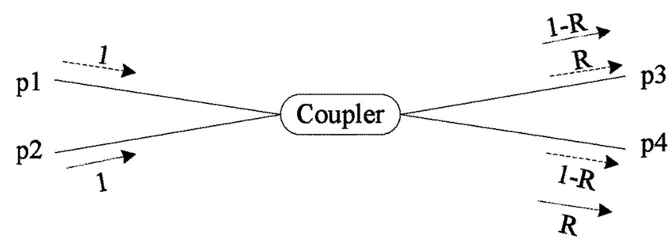
FIG. 10 is a schematic structural diagram of a coupler according to an embodiment of the present invention.

As shown in FIG. 10, a split ratio of a non-directional 2*2 coupler generally is symmetrical. For example, from a p1 port is used for input and an output ratio of a p3 is x %, an output ratio of a p4 is 1−x %; and if a p2 is used for input, the output ratio of the p3 is 1−x % and the output ratio of the p4 is x %. As shown in FIG. 10, the output ratios of the p3 and the p4 are 1−R and R, respectively.

Also referring to FIG. 9, it is assumed that the p1 is connected to the WDM1, the p3 is connected to the WDM2, a length of an optical fiber looped back from the p4 to the p2 is far greater than a coherence length (mixing of a loopback signal and an input signal produces no interference) for transmission of an optical signal, and an additional loss of a coupler and a loopback optical fiber loss may be ignored; then, output optical power of the p3 may be expressed as the following formula (1):

$$P_{out} = RP_{in}(t) + \sum_{N=1}^{\infty} (1-R)^2 R^{N-1} P_{in}(t - Nt_d) \tag{1}$$

R is a split ratio, Pin(t) is input power of the p1, N represents the number of loops of a signal in an optical fiber loop, and td represents a delay for one loop, where td=L*n/c, where L is a length of a fiber for one loop, n is a refractive index of a fiber core group of a fiber, and c is the vacuum speed of light. The first item on the right of the formula (1) represents a signal directly coupled and output, and the second item represents a co-channel crosstalk noise in a band superimposed in a loopback manner. Average input power of a signal is generally constant, and a spontaneous emission noise carried in an input signal is ignored; then, a signal to noise ratio may be approximately expressed as the following formula (2):

$$SNR \approx \frac{R}{\sum_{N=1}^{\infty} (1-R)^2 R^{N-1}} = \frac{R}{(1-R)^2 + R(1-R)^2 + R^2(1-R)^2 + KK} \tag{2}$$

Figure 11:
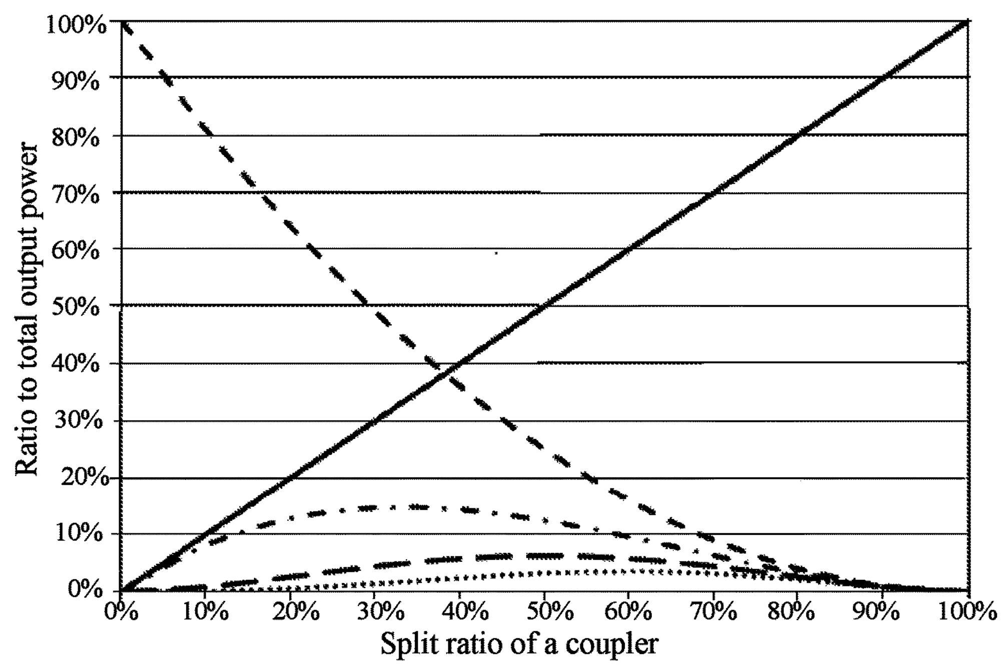
FIG. 11 is a schematic diagram of a relationship between a signal transmission direction, the number of looped loops, and a split ratio of a coupler according to an embodiment of the present invention.

If signals, in different transmission directions and looping for different numbers of loops, in total output power are resolved, a relationship between a ratio thereof and a split ratio of a coupler is shown in FIG. 11. A power ratio of a signal output by direct coupling from the P1 to the P3 is equal to a split ratio of the coupler. A rule of a power ratio of a signal looping the coupler for one loop is $(1-R)^2$, and a delay td is generated. A rule of a power ratio of a signal for two loops is $R(1-R)^2$, and a delay 2*td is generated. For a power ratio of a signal for more loops, a power ratio of a signal for one loop is the power ration of the signal for the previous loop multiplied by R, and a delay increases by td compared with the previous loop. For details, refer to the relationship between the power ratio of signals in different transmission directions and the split ratio of the coupler shown in FIG. 11. In FIG. 11, a solid line from upper right to lower left is a direct coupling output, a short dashed line is an output for looping one loop, a short dashed line with dots is an output for looping two loops, a long dashed line is an output for looping three loops, and a dotted line is an output for looping four loops.

Seen from FIG. 11, an output power ratio for looping one loop is in an opposite trend relationship with the split ratio of the coupler, which means that if the split ratio of the coupler is too large, power of a signal looping one loop is dominant in output power and the signal may be considered as a dominant signal, which is not conducive to scrambling performance. A split ratio of the coupler corresponding to optimal scrambling performance is at an intersection of a direct coupling output and an output for looping one loop, that is, $(1-R)^2=R$ is met. The following formula (3) is obtained:

$$R = \frac{3-\sqrt{5}}{2} \approx 38.2\% \tag{3}$$

Figure 12A:
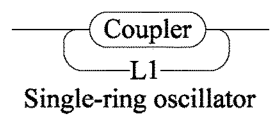
FIG. 12A is a schematic structural diagram of a single-ring oscillator according to an embodiment of the present invention.
Figure 12B:
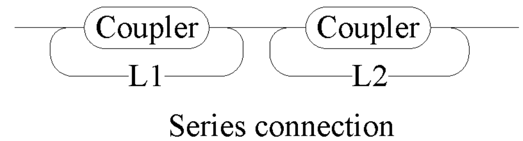
FIG. 12B is a schematic structural diagram of a ring oscillator connected in series according to an embodiment of the present invention.
Figure 12C:
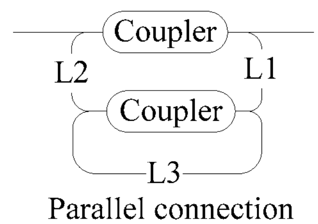
FIG. 12C is a schematic structural diagram of a ring oscillator connected in parallel according to an embodiment of the present invention.
Figure 12D:
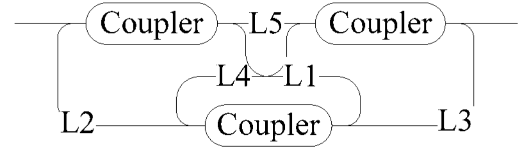
FIG. 12D is a schematic structural diagram of a ring oscillator connected in a series and parallel connection manner according to an embodiment of the present invention.
Figure 12E:
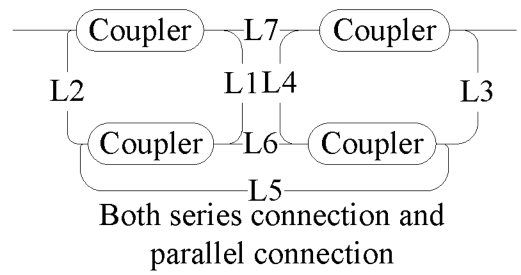
FIG. 12E is a schematic structural diagram of a ring oscillator connected in a series and parallel connection manner according to an embodiment of the present invention.

In order to enable a signal to be scrambled more adequately, two or more than two 2*2 couplers may be connected in series or in parallel. Couplers may use different combinations of split ratios, and different loopback optical fiber lengths may also be combined, as shown in FIG. 12A to FIG. 12E. FIG. 12A to FIG. 12C show a single-ring oscillator, a ring oscillator connected in series, and a ring oscillator connected in parallel, respectively, and FIG. 12D and FIG. 12E are two ring oscillators connected in a series and parallel connection manner, where L1 to L7 are all optical fibers.

In terms of a crosstalk penalty, the crosstalk penalty is related to a signal modulation format, a decision receiving manner, crosstalk signal correlation, and distribution of crosstalk noises. For example, in a modulation format of OOK (On-Off Keying, binary on-off keying), a receiver uses direct current coupling of a fixed decision, and a power penalty relationship is as the following formula (4):

$$P_p(\text{dB}) = -10\times\log(1-4\times10^{\gamma_t(dB)/20}) \tag{4}$$

where, $\gamma_t$ is a crosstalk power ratio (logarithmic format).

Solution 2

Figure 13:
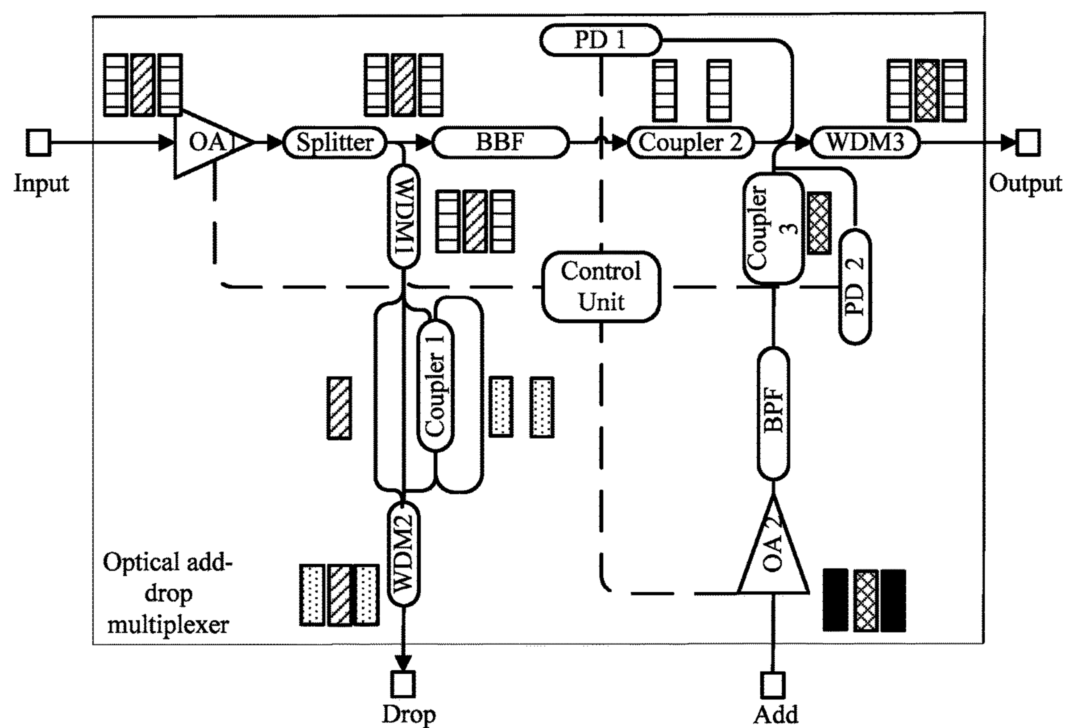
FIG. 13 is a schematic structural diagram of an optical add-drop multiplexer according to an embodiment of the present invention.

According to an embodiment solution of the present invention, an apparatus of solution 2 is shown in FIG. 13 (FIG. 13 shows only one direction; and an opposite direction is completely symmetrical to the one direction, which is not described again). A splitter (Splitter) is used at an input end of an OADM BU apparatus to separate input signals into two lines. In a branch, a wavelength division multiplexer (WDM1) is used to separate drop signals and express signals. An express signal passes through an input end of a 2*2 coupler 1 (Coupler1), where an output end of the Coupler1 is connected to another input end to form a ring oscillator in a loopback manner, and another output end of the Coupler1 is combined with a drop signal by using a wavelength division multiplexer 2 (WDM2), and a combined signal is output from a drop end. A band block filter (BBF) in one line of express signals blocks a drop signal, and the express signals are combined with an Add (add) signal by using a wavelength division multiplexer 3 (WDM3), and then a combined signal is output. In one line of add signals, a Loading (loading) signal is blocked by a band pass filter (BPF), the Add signals pass through the band pass filter and are then combined with an express signal and a combined signal is output. Generally, on an input side and an Add side, optical amplifiers (OA1 and OA2) are respectively used at input ends to compensate for an insertion loss caused by an OADM. Couplers (Coupler2 and Coupler3) are respectively used between the band block filter and an output combiner and between the band pass filter and the output combiner to couple a part of power, and the band block filter and the band pass filter are connected to photoelectric detectors (PD1 and PD2) for detecting power and receiving a command. Both the optical detectors (PD1 and PD2) and the optical amplifiers (OA1 and OA2) are connected to a control unit (Control Unit), and output power of the optical amplifiers may be fed back, by using the optical detectors, to the control unit for feedback control, so as to implement a management capability of power balancing between an express signal and an Add signal.

Signal flow: Input signals are amplified by the optical amplifier (OA1) at an input end and then separated into two parts. One part is connected to the wavelength division multiplexer 1 (WDM1) in one path of a drop signal, a drop signal and an express signal are separated, then the express signal passes through a ring oscillator that is formed by the 2*2 coupler (Coupler1), and a scrambled express signal is output. Then, the scrambled express signal is combined with a drop signal by using the wavelength division multiplexer 2 (WDM2), and then a combined signal is output from a drop end. The other part of signals passes through a band block filter (BBF), a drop signal in the other part of the signals is blocked, and an express signal is retained and output, and then passes through the coupler 2 (Coupler2) and the wavelength division multiplexer 3 (WDM3) and is output. An Add signal and a Loading signal are input from an Add port, and amplified by the optical amplifier (OA2) on the Add side, and then reach the band pass filter (BPF). The band pass filter blocks the Loading signal and outputs the Add signal. The Add signal passes through the coupler 3 (Coupler3) and the combiner 3 (WDM3) and is combined with an express signal, and a combined signal is output from an output port.

The implementation solution of solution 2 in this embodiment of the present invention implements, in a branch, transparent express of a drop signal and express of a scrambled express signal, so that an express signal cannot be normally received in the branch, thereby avoiding an information security risk. In addition, an output end of the drop signal does not change power of the express signal, thereby avoiding a problem that power is excessively high due to a signal power competition after the drop signal is amplified by a repeater.

Solution 3

Figure 14:
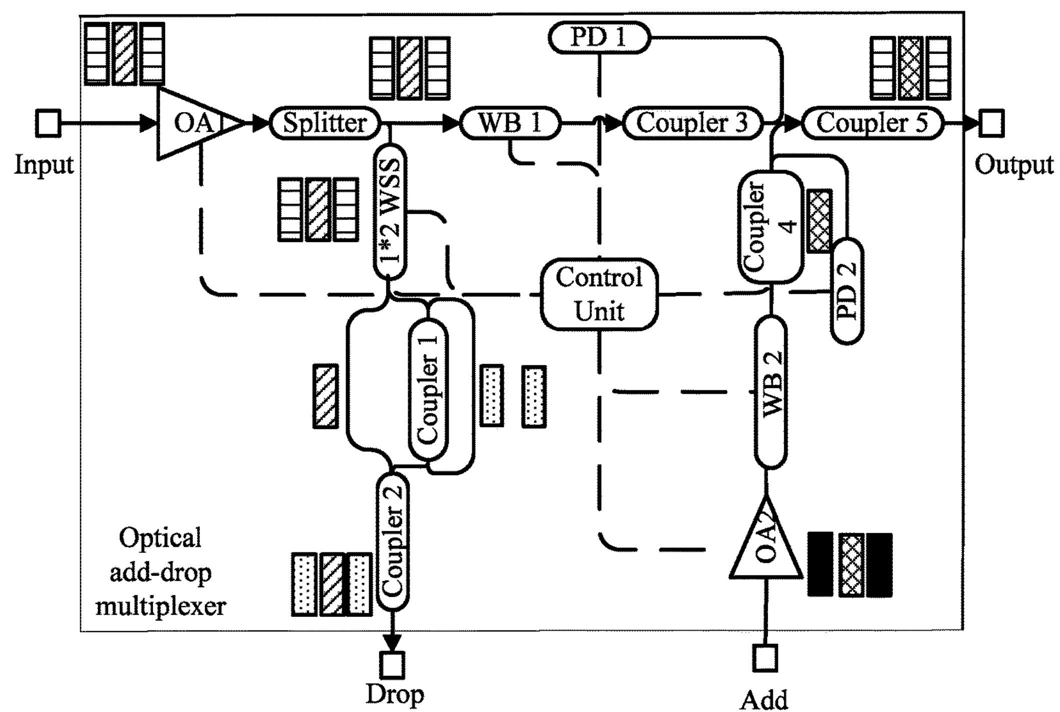
FIG. 14 is a schematic structural diagram of an optical add-drop multiplexer according to an embodiment of the present invention.

As shown in FIG. 14, a principle and a signal transmission direction are the same as those of solution 2. Based on solution 2, a wavelength division multiplexer in a transmission direction of a drop signal is replaced with a 1*2 wavelength selective switch (WSS), a band block filter in a transmission direction of an express signal and a band pass filter in a transmission direction of an add signal are replaced with wavelength blockers (WB1 and WB2), and the WSS, the WB1, the WB2, an OA1, and an OA2 are separately connected to a control unit. In this way, a reconfigurable OADM apparatus is formed. A signal flow is the same as that of solution 2, and details are not described herein again.

In the embodiment of solution 3 in this embodiment of the present invention, an express signal can be scrambled in a branch to implement a confidentiality feature, and a requirement for input power balancing of a repeater in the branch can also be met.

Solution 4

Figure 15:
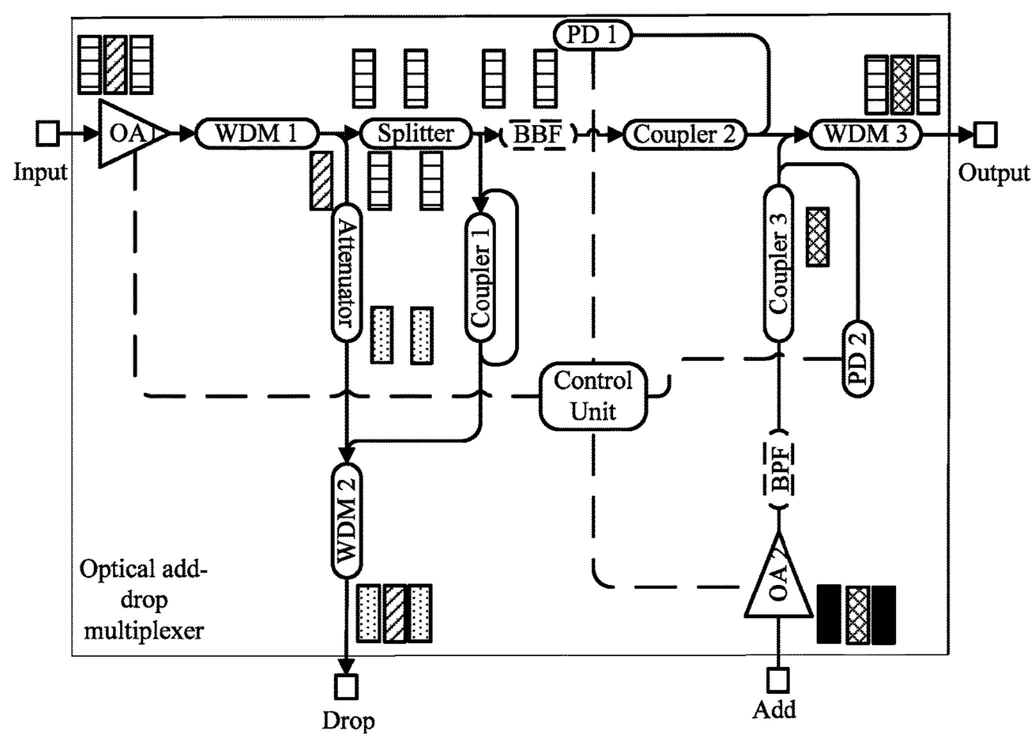
FIG. 15 is a schematic structural diagram of an optical add-drop multiplexer according to an embodiment of the present invention.

An embodiment of solution 4 is a variation based on the embodiment of solution 2. As shown in FIG. 15, a manner of "first wavelength division and then splitting" is used to replace a manner of "first splitting and then wavelength division" in the embodiment of solution 2. That is, on an input side of an OADM, drop signals and express signals are first separated by using a wavelength division multiplexer 1 (WDM1); then a part of express signals are separated by a splitter (Splitter), scrambled, and combined with a drop signal by using a wavelength division multiplexer 2 (WDM2); and then a combined signal is output through an output end in a branch. In order to balance a ratio of power of a scrambled signal to power of a drop signal, an optical attenuator (attenuator) generally needs to be added for drop signals in a branch (in the embodiment of solution 4, a BBF is optional. Because the Drop signals are all dropped to the branch by the WDM1. If performance of the WDM1 is relatively poor, a part of Drop signals remain in express signals. In this embodiment, a BBF is deployed to eliminate these remaining Drop signals). In a transmission direction of an express signal, a band block filter (BBF) is optionally deployed to filter out the remaining Drop signals. A WDM3 is configured to combine an express signal and an add signal, and block a Loading signal. When the WDM3 cannot completely isolate a Loading signal in a transmission direction of the add signal, a BPF also needs to be deployed in the transmission direction of the add signal to block the Loading signal. Functions of an optical amplifier, a PD, and a connected coupler are the same as those in the embodiment in solution 2 and solution 3, and details are not described herein again.

In the embodiment of solution 4 in embodiments of the present invention, a difference, in a signal flow, from the embodiments of solution 2 and solution 3 lies in that, in the embodiment of solution 4, a Drop signal is first separated by the WDM1, power of an express signal is scrambled, and then the drop signal is combined and output from a Drop end. However, in the embodiments of solution 2 and solution 3, total power is divided, light of different wavelengths are split, an express wavelength is scrambled, and then signals are combined and output from the Drop end. In this embodiment of the present invention, an express signal, after being separated by a splitter and a wavelength division multiplexer, is scrambled by using a ring oscillator to obtain a scrambled express signal, and the scrambled express signal and a drop signal are combined and dropped to a branch. For the branch, the express signal is not transparent at a physical layer. Therefore, the express signal cannot be recovered in the branch, so that an anti-eavesdropping capability is relatively strong, and information security is improved.

Solution 5

Figure 16:
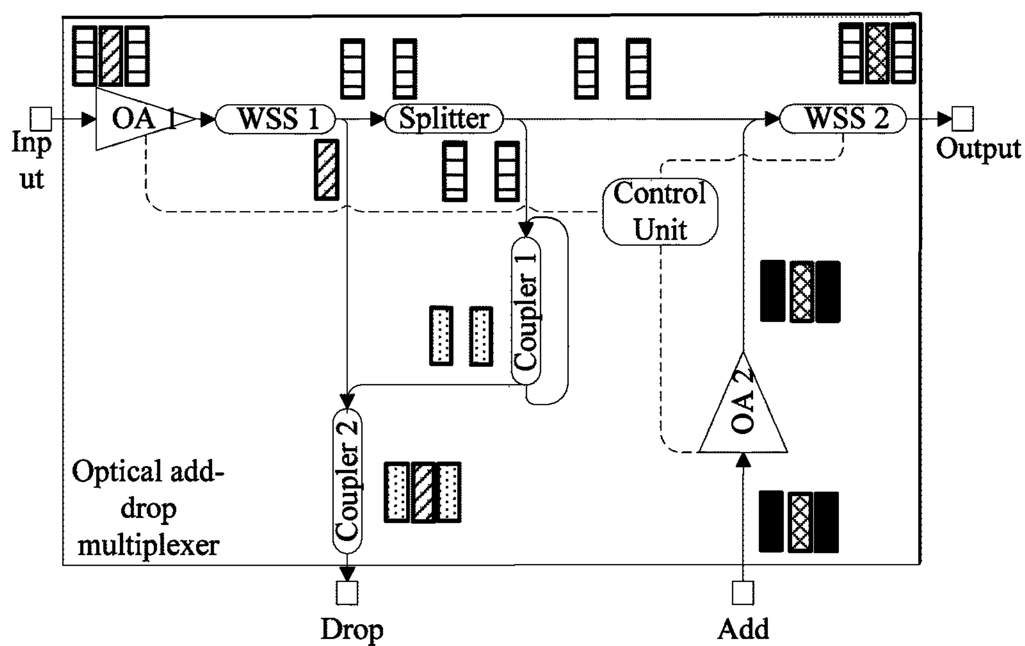
FIG. 16 is a schematic structural diagram of an optical add-drop multiplexer according to an embodiment of the present invention.

An embodiment of solution 5 is a variation based on the embodiment of solution 4. As shown in FIG. 16, in the embodiment of solution 5, a 1*2 wavelength selective switch (WSS 1) is used at an input end of an OADM apparatus to separate a Drop signal and an express signal in input signals. Then, an express signal passes through a splitter to couple a part of the express signal, passes through a ring oscillator formed by a 2*2 coupler 1 (Coupler 1), and is then output, combined with a Drop signal by using a coupler 2 (Coupler 2), and output from a Drop end. Another line of express signals separated by the splitter is connected to another 1*2 WSS (WSS 2). In a transmission direction of an add signal, a Loading signal and an Add signal are input to another input end of the another WSS (WSS 2), and the WSS2 combines the Add signal and an express signal input from another port, and then outputs a combined signal to an output end. Generally, in order to compensate for a loss of the OADM apparatus, optical amplifiers (OA1 and OA2) further need to be inserted at the input end and an Add port. In addition, there is also a control apparatus, which is connected to the two WSSs and the two optical amplifiers to control a wavelength selective status of the WSSs, signal attenuation, and output power of the optical amplifiers. In this embodiment of the present invention, an express signal, after being separated by a splitter and a wavelength selective switch, is scrambled by using a ring oscillator to obtain a scrambled express signal, and the scrambled express signal and a drop signal are combined and dropped to a branch. For the branch, the express signal is not transparent at a physical layer. Therefore, the express signal cannot be recovered in the branch, so that an anti-eavesdropping capability is relatively strong, and information security is improved.

Figure 17:
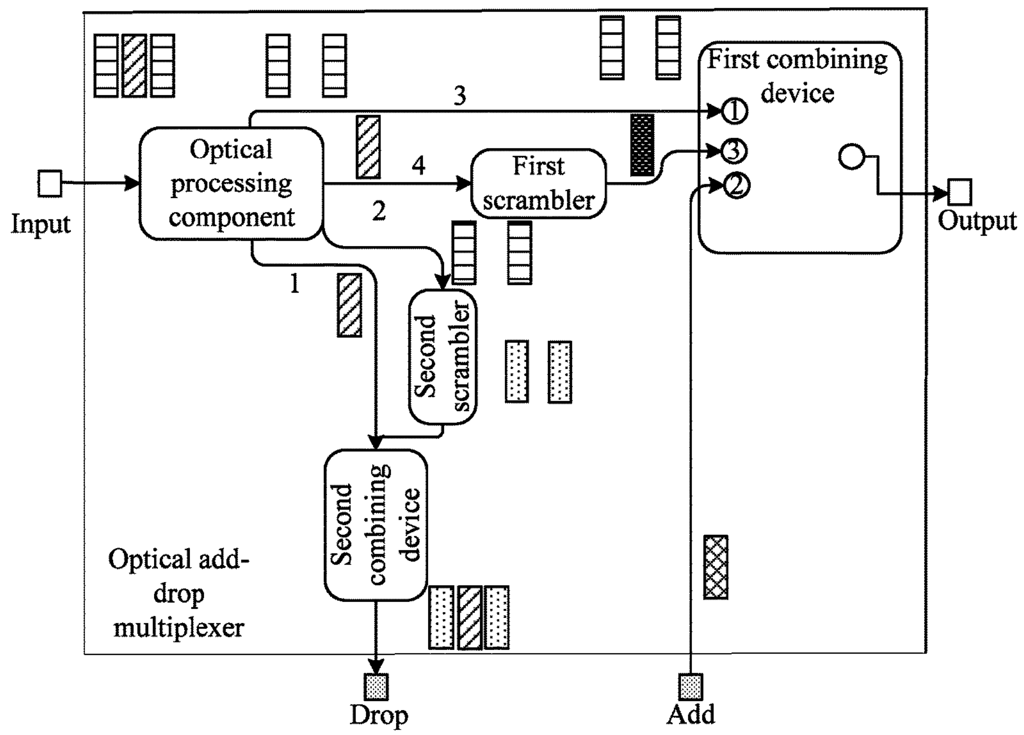
FIG. 17 is a schematic structural diagram of an optical add-drop multiplexer according to an embodiment of the present invention.

An embodiment of the present invention further provides another optical add-drop multiplexer. As shown in FIG. 17 and referring to FIG. 3, the optical processing component further includes a fourth output end (an output end numbered 4 in the optical processing component); the first combining device further includes a third input end (a circle numbered 3); and the optical add-drop multiplexer further includes a first scrambler.

The fourth output end of the optical processing component is connected to an input end of the first scrambler, and an output end of the first scrambler is connected to the third input end of the first combining device.

The optical processing component further processes a drop signal that is in trunk signals and enters the optical processing component into a first drop signal, where the first drop signal is the same as the drop signal; the first drop signal enters the first scrambler through the fourth output end of the optical processing component; the first scrambler scrambles the first drop signal that enters the first scrambler, to obtain a scrambled first drop signal; and the scrambled first drop signal enters the third input end of the first combining device through the output end of the first scrambler.

The first combining device further connects the first input end of the first combining device and the third input end of the first combining device to the output end of the first combining device; and the express signal that enters the first input end of the first combining device and a scrambled drop signal that enters a third input end of the optical switching component are output from the output end of the first combining device.

The foregoing first scrambler may use a structure that is completely the same as a structure of the second scrambler, that is, the first scrambler may also use a ring oscillator to implement a scrambling function on an optical signal.

This implementation solution not only supports transparent express of a drop signal and express of a scrambled express signal in a transmission direction of the drop signal, but also supports transparent express of an express signal and scrambling of a Drop signal in a transmission direction of the express signal. This resolves a problem of input power balance in an OADM submarine cable system fault scenario, so as to support the system in implementing a fault redundancy function, and also an information security risk is effectively avoided.

Figure 18:
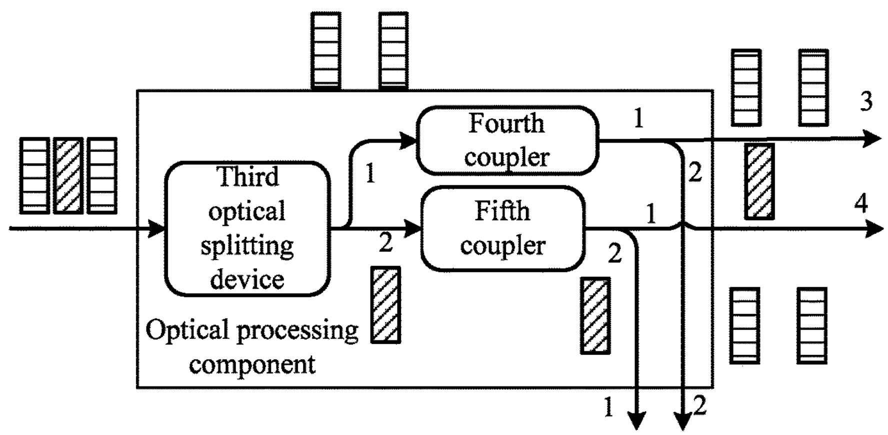
FIG. 18 is a schematic structural diagram of an optical processing component according to an embodiment of the present invention.

Based on the structure shown in FIG. 17, an embodiment of the present invention further provides another optional implementation solution of the optical processing component. As shown in FIG. 18, specifically, the optical processing component includes: a third optical splitting device, a fourth coupler, and a fifth coupler.

An input end of the third optical splitting device is a trunk input end, the third optical splitting device includes two output ends, a first output end of the third optical splitting device is connected to an input end of the fourth coupler, a second output end of the third optical splitting device is connected to an input end of the fifth coupler; the fourth coupler includes a first output end and a second output end, and the fifth coupler includes a first output end and a second output end; the first output end of the fourth coupler is connected, as the third output end of the optical processing component, to the first input end of the first combining device; the second output end of the fourth coupler is connected, as the second output end of the optical processing component, to the input end of the second scrambler; the first output end of the fifth coupler is connected, as the fourth output end of the optical processing component, to the first scrambler; the second output end of the fifth coupler is connected, as the first output end of the optical processing component, to the first input end of the second combining device; and the output end of the first scrambler is connected to the third input end of the optical switching component.

Trunk signals including the express signal and the drop signal enter the third optical splitting device from the input end of the third optical splitting device, the third optical splitting device splits the trunk signals into the express signal and the drop signal, the express signal enters the input end of the fourth coupler through the first output end of the third optical splitting device, and the drop signal enters the input end of the fifth coupler through the second output end of the third optical splitting device; the fourth coupler processes the express signal that enters the input end of the fourth coupler into the first express signal and the second express signal, where the first express signal and the second express signal are the same as the express signal; the first express signal enters the first input end of the first combining device through the first output end of the fourth coupler, and the second express signal enters the input end of the second scrambler through the second output end of the fourth coupler; the fifth coupler processes the drop signal that enters the input end of the fifth coupler into the first drop signal and the second drop signal, where the first drop signal and the second drop signal are the same as the drop signal; and the first drop signal enters the input end of the first scrambler through the first output end of the fifth coupler, and the second drop signal enters the first input end of the second combining device through the second output end of the fifth coupler.

In the solution in the foregoing embodiment, trunk signals are first processed into two lines of trunk signals, and then splitting processing is separately performed on the two lines of trunk signals to obtain two drop signals and two express signals. Only three devices are needed to complete a function of an optical processing component.

Figure 19:
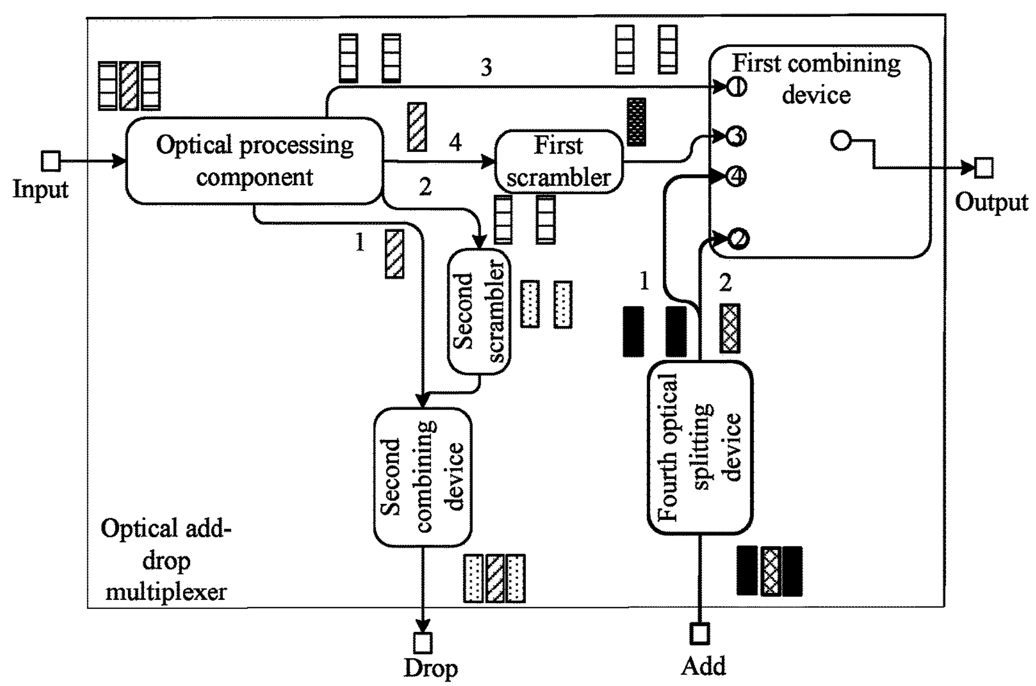
FIG. 19 is a schematic structural diagram of an optical add-drop multiplexer according to an embodiment of the present invention.

Further, referring to FIG. 19, branch signals include a loading signal and an add signal, and the add-drop multiplexing branching unit further includes a fourth optical splitting device.

A connection relationship between devices is as follows: The first combining device further includes a fourth input end; a first output end of the fourth optical splitting device is connected to the fourth input end of the first combining device; and a second output end of the fourth optical splitting device is connected to a second input end of the first combining device.

A transmission direction of an optical signal is as follows: The branch signals including the loading signal and the add signal enter an input end of the fourth optical splitting device, the fourth optical splitting device splits the branch signals that enter the fourth optical splitting device into the loading signal and the add signal, the loading signal enters a fourth input end of the optical switching component through the first output end of the fourth optical splitting device, and the add signal enters a second input end of the optical switching component through the second output end of the fourth optical splitting device.

The first combining device further connects the second input end and the fourth input end to the output end of the first combining device, and a loading signal that enters the fourth input end of the first combining device and an add signal that enters the fourth input end of the first combining device are output from the output end of the first combining device.

This implementation solution not only supports transparent express of a drop signal and express of a scrambled express signal in a transmission direction of the drop signal, but also supports transparent express of an express signal and scrambling of a Drop signal in a transmission direction of the express signal; in addition, a selection can be performed according to an requirement to receive an express signal and a Loading signal, and a scrambled Drop signal and Add signal in a combined manner. This resolves a problem of input power balance of a repeater in an OADM submarine cable system fault scenario and in a scenario of uncompleted construction in a branch, so as to support the system in implementing a fault redundancy function, and also an information security risk is effectively avoided.

Figure 20:
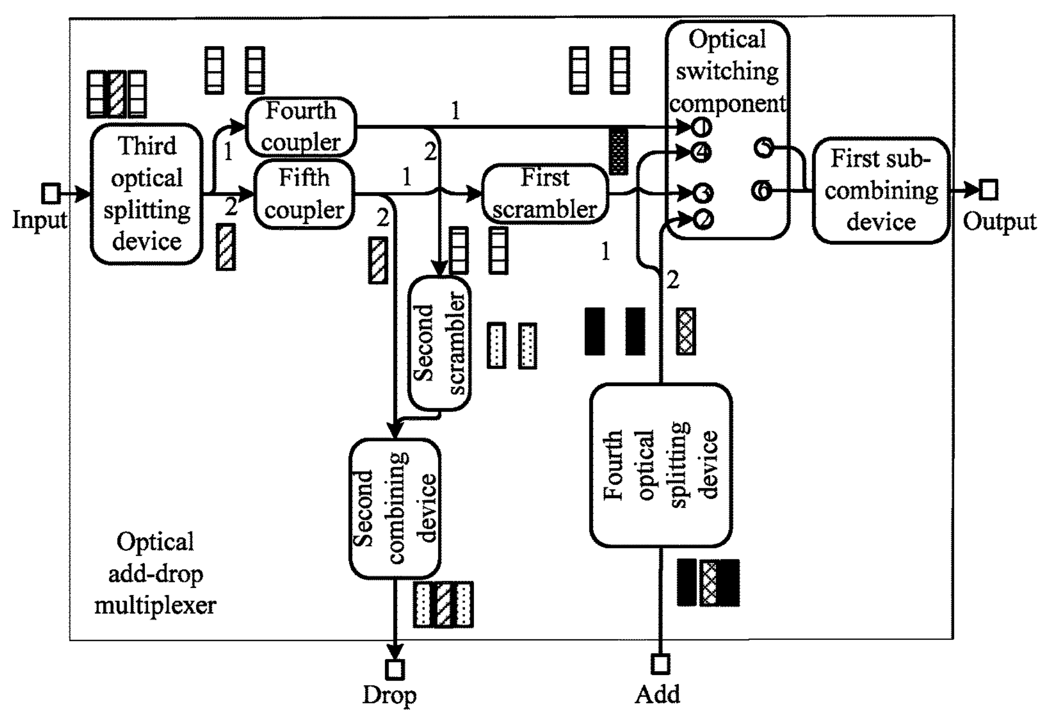
FIG. 20 is a schematic structural diagram of an optical add-drop multiplexer according to an embodiment of the present invention.

Based on the solutions in the foregoing embodiments, an embodiment of the present invention provides a solution to implementing a first combining device by using an optical switching component and a first sub-combining device. Referring to FIG. 20, specifically, the optical add-drop multiplexer includes:

a third optical splitting device, a fourth optical splitting device, a fourth coupler, a fifth coupler, a first scrambler, a second scrambler, an optical switching component, a second combining device, and a first sub-combining device.

A connection manner of each device is specifically as follows: An input end of the third optical splitting device is a trunk input end, the third optical splitting device includes two output ends, a first output end of the third optical splitting device is connected to an input end of the fourth coupler, and a second output end of the third optical splitting device is connected to an input end of the fifth coupler; the fourth coupler includes a first output end and a second output end, and the fifth coupler includes a first output end and a second output end; the first output end of the fourth coupler is connected to a first input end of the optical switching component, the second output end of the fourth coupler is connected to an input end of the second scrambler, the first output end of the fifth coupler is connected to the first scrambler, the second output end of the fifth coupler is connected to an input end of the first sub-combining device, and an output end of the first sub-combining device is a branch output end; the output end of the first sub-combining device is connected to a third input end of the optical switching component, and an output end of the second scrambler is connected to the input end of the first sub-combining device; an input end of the fourth optical splitting device is a branch input end, the fourth optical splitting device includes two output ends, a first output end of the fourth optical splitting device is connected to a fourth input end of the optical switching component, and a second output end of the fourth optical splitting device is connected to a second input end of the optical switching component; the optical switching component includes two output ends, and a first output end (a circle location indicated by a label 5 in FIG. 20) of the optical switching component and a second output end (a circle location indicated by a label 6 in FIG. 20) of the optical switching component are respectively connected to a first input end and a second input end of the second combining device; and the output end of the first sub-combining device is a trunk output end.

Detailed descriptions of a transmission direction of an optical signal and processing of each device are as follows: Trunk signals including the express signal and the drop signal enter the third optical splitting device from the input end of the third optical splitting device, the third optical splitting device splits the trunk signals into the express signal and the drop signal, the express signal enters the input end of the fourth coupler through the first output end of the third optical splitting device, and the drop signal enters the input end of the fifth coupler through the second output end of the third optical splitting device; the fourth coupler processes the express signal that enters the input end of the fourth coupler into a first express signal and a second express signal, where the first express signal and the second express signal are the same as the express signal, the first express signal enters the first input end of the optical switching component through the first output end of the fourth coupler, and the second express signal enters the input end of the second scrambler through the second output end of the fourth coupler; the second scrambler scrambles the express signal that enters the input end of the second scrambler, to obtain a scrambled express signal, and the scrambled express signal enters the input end of the first sub-combining device through the output end of the second scrambler; the fifth coupler processes the drop signal that enters the input end of the fifth coupler into a first drop signal and a second drop signal, where the first drop signal and the second drop signal are the same as the drop signal, the first drop signal enters the input end of the first scrambler through the first output end of the fifth coupler, the first scrambler scrambles the drop signal that enters the input end of the first scrambler to obtain a scrambled drop signal, the scrambled drop signal enters the third input end of the optical switching component through the output end of the first scrambler, and the second drop signal enters the input end of the first sub-combining device through the second output end of the fifth coupler; and the first sub-combining device combines the drop signal that enters the first sub-combining device and the scrambled express signal, and then outputs a combined signal.

Branch signals including a loading signal and an add signal enter an input end of the fourth optical splitting device, the fourth optical splitting device splits the branch signals that enter the fourth optical splitting device into the loading signal and the add signal, the loading signal enters the fourth input end of the optical switching component through the first output end of the fourth optical splitting device, and the add signal enters the second input end of the optical switching component through the second output end of the fourth optical splitting device.

The optical switching component has three states: In a first state, the first input end of the optical switching component is connected to the first output end of the optical switching component, the third input end of the optical switching component is connected to the second output end of the optical switching component, the express signal that enters the first input end of the optical switching component is output from the first output end of the optical switching component, and the scrambled drop signal that enters the third input end of the optical switching component is output from the second output end of the optical switching component; in the second state, the second input end of the optical switching component is connected to the second output end of the optical switching component, the fourth input end of the optical switching component is connected to the first output end of the optical switching component, the loading signal that enters the fourth input end of the optical switching component is output from the first output end of the optical switching component, and the add signal that enters the second input end of the optical switching component is output from the second output end of the optical switching component; and in the third state, the first input end of the optical switching component is connected to the first output end of the optical switching component, the second input end of the optical switching component is connected to the second output end of the optical switching component, the express signal that enters the first input end of the optical switching component is output from the first output end of the optical switching component, and the add signal that enters the second input end of the optical switching component is output from the second output end of the optical switching component.

The first sub-combining device combines an express signal that enters the first sub-combining device through the optical switching component with a scrambled drop signal, and then outputs a combined signal; or the first sub-combining device combines a loading signal that enters the first sub-combining device through the optical switching component with an add signal, and outputs a combined signal; or the first sub-combining device combines an express signal that enter the first sub-combining device through the optical switching component with an add signal, and then outputs a combined signal.

In this embodiment of the present invention, after being separated from an optical processing component, an express signal is scrambled by a scrambler to obtain a scrambled express signal, and the scrambled express signal is combined with a drop signal and dropped to a branch. For the branch, the express signal is not transparent at a physical layer; therefore, an original express signal cannot be recovered in the branch, so that an anti-eavesdropping capability is relatively strong and information security is improved. In addition, two states of the optical switching component can implement control over signals, thereby implement redundancy at a trunk and a branch.

Optionally, the third optical splitting device and the fourth optical splitting device are wavelength division multiplexers or 1*2 wavelength selection switches; the second optical splitting device is a wavelength division multiplexer or a 1*2 wavelength selection switch; and the first optical selection device is a band block filter or a wavelength blocker.

Optionally, if the foregoing first combining device has three input ends, it can be directly implemented by using one 1*3 wavelength selection switch; and if the first combining device includes four input ends, a 1*4 wavelength selection switch can be directly used. If the first combining device has four input ends, it can be formed by a separate **1*2** optical switch and a wavelength division multiplexer or a coupler. If two separately 1*2 wavelength selection switches are used, it may be specifically as follows: The optical switching component includes a first 1*2 optical switch and a second 1*2 optical switch, where a first input end and a second input end of the first 1*2 optical switch are respectively used as a first input end and a second input end of the optical switching component, and a first input end and a second input end of the second 1*2 optical switch are respectively used as a third input end and a fourth input end of the optical switching component; and an output end of the first 1*2 optical switch and an output end of the second 1*2 optical switch are used jointly as output ends of the optical switching component. For this solution, a more detailed description is provided in an example in an embodiment corresponding to the subsequent FIG. 21. The first 1*2 optical switch and the second 1*2 optical switch respectively correspond to Switch 1 (optical switch 1) and Switch 2 (optical switch 2) in FIG. 21.

Optionally, a scrambler is a device that performs a scrambling operation on an optical signal. One implementation solution provided by this embodiment of the present invention is as follows: The scrambler is a ring oscillator.

This embodiment of the present invention provides a specific implementation solution to forming a ring oscillator based on a 2*2 coupler as follows: The ring oscillator includes at least one 2*2 coupler; if the ring oscillator is formed by at least two 2*2 couplers, the at least two 2*2 couplers are connected in a series connection or parallel connection manner; and if the ring oscillator is formed by at least three 2*2 couplers, the at least three 2*2 couplers are connected in a series connection manner, a parallel connection manner, or a series connection and parallel connection manner.

As an exemplary implementation solution, a split ratio of the 2*2 coupler is $$\frac{3-\sqrt{5}}{2}.$$

Optionally, the add-drop multiplexing branching unit may further include: a second band block filter or a second wavelength blocker, and a third band block filter or a third wavelength blocker;

the second band block filter or the second wavelength blocker is connected in series between the third optical splitting device and the fourth coupler, and is configured to block a drop signal among express signals that passes through the second band block filter or the second wavelength blocker; and the third band block filter or the third wavelength blocker is connected in series between the third optical splitting device and the fifth coupler, and is configured to block an express signal among drop signals that passes through the third band block filter or the third wavelength blocker. Wavelength filtering by using a band block filter or a wavelength blocker has been described in the foregoing embodiments, and details are not provided herein again.

The following embodiment provides a more detailed example of the embodiment shown in the foregoing FIG. 20. In an example of the embodiment, a third optical splitting device is WDM1, a fourth optical splitting device is WDM4, a fourth coupler is Splirrer1, a fifth coupler is Splirrer2, a first scrambler is Coupler 1, a second scrambler is Coupler 2, an optical switching component is implemented by using two optical switches, a second combining device is WDM3, and a first sub-combining device is WDM2. Details are as follows:

Generally, for an OADM BU apparatus, in addition to a requirement of an anti-eavesdropping function, the OADM BU is required to provide a fault redundancy or fault isolation function, that is, when a trunk or a branch on one side of an OADM is faulty, a proper measurement should be taken to ensure that a signal can be normally transmitted between related non-faulty stations. An optical repeater in a submarine cable system works in a constant output power mode. When a trunk or a branch on one side of the OADM is faulty, it means a trunk input loss or an add signal loss, and consequently, remaining signals share total output power of the optical repeater. As a result, remaining signal power is extremely high, and signal transmission interruption may occur because an accumulated non-linear cost during optical fiber transmission increases or power of a receiver is overloaded. Currently, a spontaneous emission of an erbium-doped fiber amplifier (Erbium-doped Optical Fiber Amplifier, EDFA) is used to compensate for lost signal power. However, it is difficult to completely compensate for lost signal power by using the spontaneous emission of the EDFA, and moreover, spectral distribution is different, which still affects quality of a signal transmitted between normal stations. The following embodiment provides an OADM apparatus that accommodates both anti-eavesdropping and fault redundancy of an OADM system.

Figure 21:
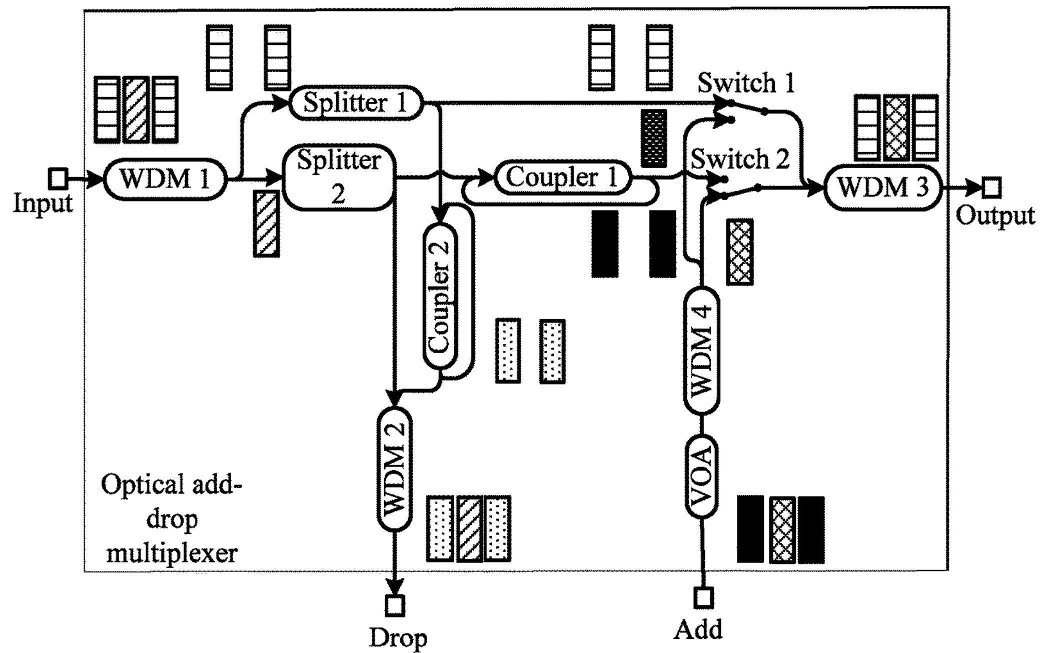
FIG. 21 is a schematic structural diagram of an optical add-drop multiplexer during a normal project according to an embodiment of the present invention.

As shown in FIG. 21, a wavelength division multiplexer (WDM1) is used at an input end of an OADM BU apparatus to separate a Drop signal and an express signal in input signals, and then each of the Drop signal and the express signal is separately split into two signals by a splitter (Splitter1 and Splitter2). One express signal passes through a ring oscillator formed by a 2*2 coupler (Coupler2), then is output, and combined with one Drop signal by using a wavelength division multiplexer (WDM2), and then is output from a Drop end; the other express signal is connected to one input end of a 1*2 optical switch (Switch1); the other Drop signal passes through a ring oscillator formed by another 2*2 coupler (Coupler1), an output scrambled Drop signal is connected to one input end of another 1*2 optical switch (Switch2), and output ends of the two 1*2 optical switches are combined by using a wavelength division multiplexer (WDM3) and then connected to an output end; in a transmission direction of an add signal, a Loading signal and an Add signal are separated by using a wavelength division multiplexer (WDM4), and are respectively connected to the other input ends of the two optical switches (Switch1 and Switch2), and in front of the wavelength division multiplexer (WDM4), a variable optical attenuator (VOA) may be optionally added to manage power balance between the Add signal and the express signal.

When the OADM is in a normal operating scenario (FIG. 21), both an input signal of an input end of the OADM and an input signal of an Add port normally exist, the optical switch 1 (Switch 1) is controlled so that the express signal is connected to the output port of the optical switch 1, the optical switch 2 (Switch 2) is controlled so that an uploading signal is connected to the output port of the optical switch 2, and then the express signal and the Add signal are output after being combined by using the wavelength division multiplexer (WDM3).

Figure 22:
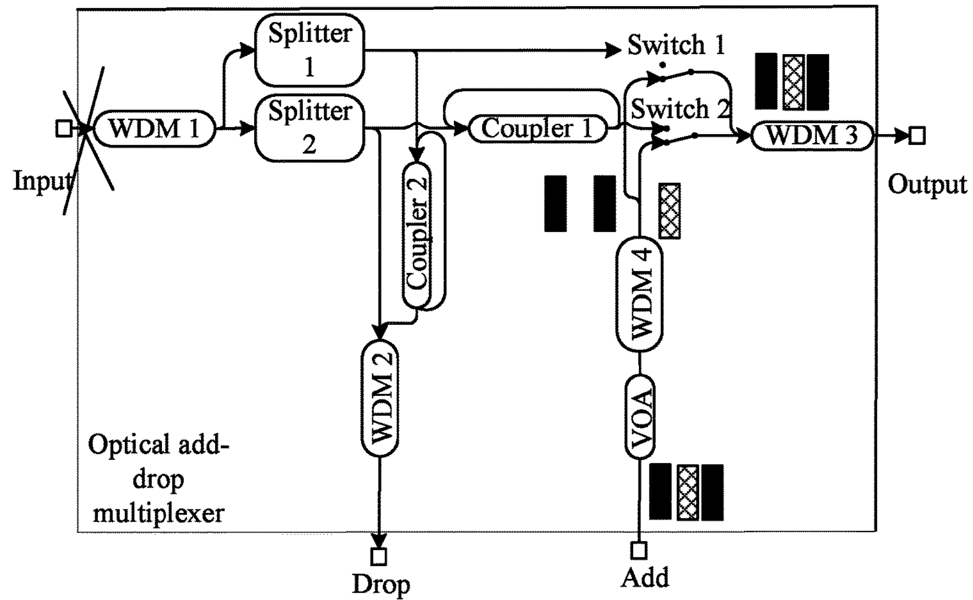
FIG. 22 is a schematic structural diagram of an optical add-drop multiplexer when a trunk is disconnected according to an embodiment of the present invention.

When the OADM is in a trunk fault scenario (as shown in FIG. 22, a fault occurs in a direction marked with a cross), an input signal of a trunk of the OADM is lost, and an input signal of the Add port normally exists. In this case, the optical switch 1 (Switch 1) is controlled to connect to an input end and an output end of a Loading optical signal; a state of the optical switch 2 is unchanged; and a Loading signal and an Add signal of an input end for a branch signal are respectively received by the two optical switches selectively, and output after being combined by using the wavelength division multiplexer (WDM4). In this way, a lost express signal is filled, so that a ratio of power of the Add signal keeps stable, and normal communication can be maintained between a branch station and a station on a non-faulty side of the trunk.

Figure 23:
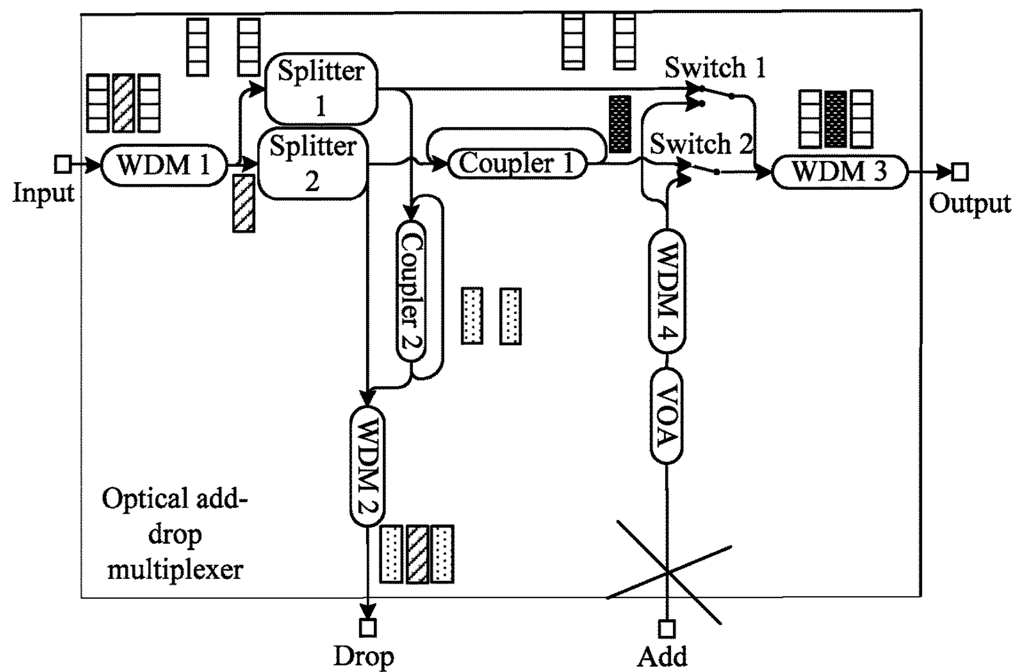
FIG. 23 is a schematic structural diagram of an optical add-drop multiplexer when a branch is disconnected according to an embodiment of the present invention.

When the OADM is in a branch fault scenario or in a reserved OADM branch scenario (a large investment is required in a submarine cable system project; for some projects, trunks are established in phase 1, and branches are established in phase 2; and in this case, before the branches are completely established, no signal is input from an Add port of an OADM device), referring to FIG. 23, a fault occurs in a direction marked with a cross. In this case, an input signal of the trunk of the OADM is normal, and an input signal of the Add port is lost or does not exist. The optical switch 1 (Switch 1) is controlled so that an express signal is connected to the output port of the optical switch 1, the optical switch 2 (Switch 2) is controlled so that a scrambled drop signal is connected to the output port of the optical switch 2, and then the express signal and the scrambled drop signal are output after being combined by using the wavelength division multiplexer (WDM3). In this way, a lost or absent Add signal is filled, so that a ratio of power of the express signal to total power keeps stable, and normal communication can be maintained between trunk stations on both sides of the OADM.

This implementation solution not only supports transparent express of a drop signal and express of a scrambled express signal in a transmission direction of the drop signal, but also supports transparent express of an express signal and scrambling of a Drop signal in a transmission direction of the express signal; in addition, selection can be performed according to a requirement to receive an express signal and a Loading signal, and a scrambled Drop signal and Add signal in a combined manner, which resolves a problem of input power balance of a repeater in an OADM submarine cable system fault scenario and in a scenario of uncompleted branch construction, so as to support the system in implementing a fault redundancy function, and also an information security risk is effectively avoided.

Figure 1:
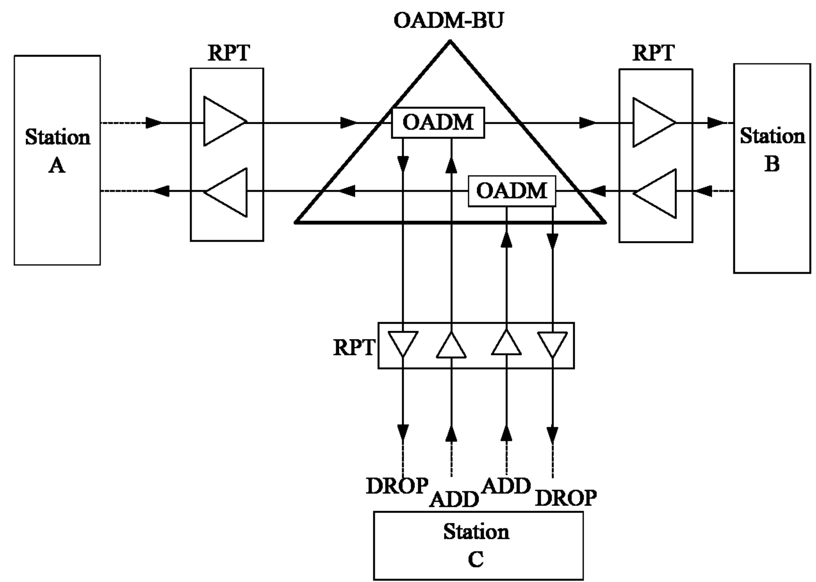
FIG. 1 is a schematic diagram of an application environment of an optical add-drop multiplexer according to the prior art.
Figure 2:
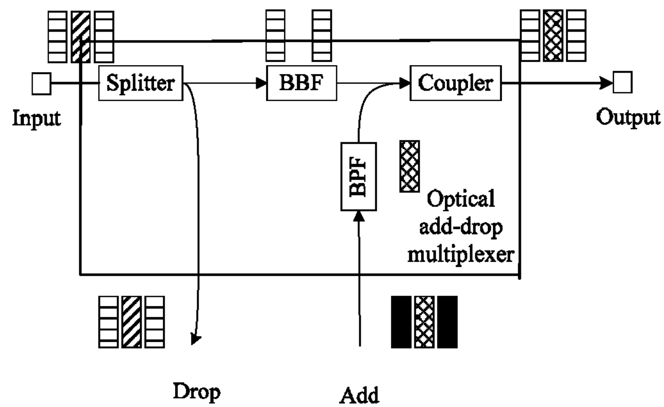
FIG. 2 is a schematic diagram of signal transmission of an OADM according to the prior art.
Figure 24:
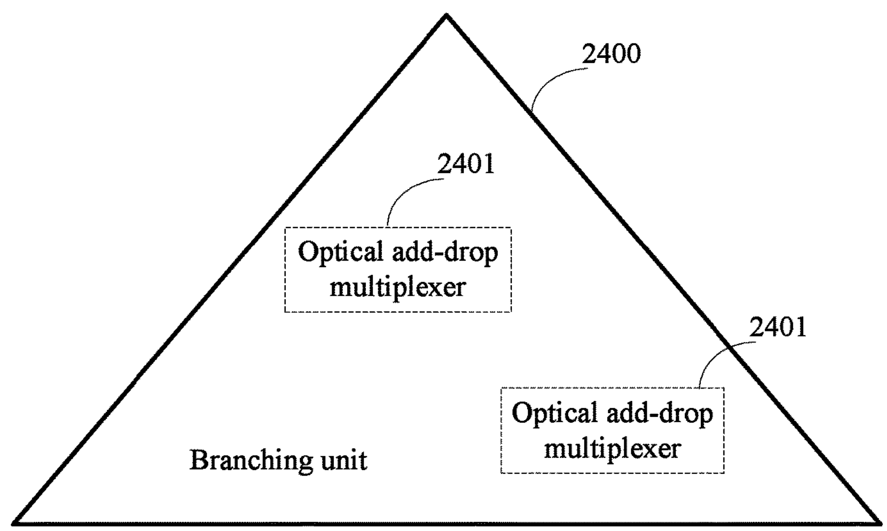
FIG. 24 is a schematic structural diagram of a branching unit according to an embodiment of the present invention.

An embodiment of the present invention further provides a branching unit. As shown in FIG. 24, the splitter 2400 includes an add-drop multiplexer 2401. The optical add-drop multiplexer 2401 included in the splitter 2400 in this embodiment of the present invention is any optical add-drop multiplexer 2401 provided in this embodiment of the present invention. There may be one optical add-drop multiplexer 2401; generally, there may be two optical add-drop multiplexers 2401; and the specific number is not limited in this embodiment of the present invention. Reference may be made to the example that two OADMs are integrated into the branching unit 2400 in FIG. 1. For a structure of the OADM, refer to the foregoing embodiment descriptions about the OADM.

In addition, a person of ordinary skill in the art may understand that all or a part of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical add-drop multiplexer, comprising:

an optical processing component, a first combining device, a second combining device, and a second scrambler, wherein the optical processing component comprises an input end, a first output end, a second output end, and a third output end; the first combining device comprises a first input end, a second input end, and an output end; and the second combining device comprises a first input end, a second input end, and an output end;

the first output end of the optical processing component is connected to the first input end of the second combining device, and the second output end of the optical processing component is connected to an input end of the second scrambler; an output end of the second scrambler is connected to the second input end of the second combining device; and the third output end of the optical processing component is connected to the first input end of the first combining device; and trunk signals comprising an express signal and a drop signal enter the optical processing component from the input end of the optical processing component, and the optical processing component processes the trunk signals into a second drop signal, a first express signal, and a second express signal, wherein the first express signal and the second express signal are the same as the express signal, and the second drop signal is the same as the drop signal; the second drop signal enters the first input end of the second combining device through the first output end of the optical processing component; the first express signal enters the input end of the second scrambler through the second output end of the optical processing component, the second scrambler scrambles the first express signal that enters the input end of the second scrambler to obtain a scrambled express signal, and the scrambled express signal enters the second input end of the second combining device through the output end of the second scrambler; the second combining device combines the second drop signal that enters the first input end of the second combining device and the scrambled express signal that enters the second input end of the second combining device, and then outputs a second combined signal at the output end of the second combining device; and, the second express signal enters the first input end of the first combining device through the third output end of the optical processing component, and the first combining device combines the second express signal that enters the first input end of the first combining device and an add signal that is from a branch adding port of the optical add-drop multiplexer and enters the second input end of the first combining device, and then outputs a first combined signal at the output end of the first combining device, wherein the optical processing component comprises:

a second coupler and a second optical splitting device, wherein an input end of the second optical splitting device serves as the input end of the optical processing component, a first output end of the second optical splitting device serves as the first output end of the optical processing component, and a second output end of the second optical splitting device is connected to an input end of the second coupler; and a first output end of the second coupler serves as the second output end of the optical processing component, and a second output end of the second coupler serves as the third output end of the optical processing component; and the trunk signals comprising the express signal and the drop signal enter the second optical splitting device from the input end of the second optical splitting device, the second optical splitting device separates the trunk signals that enter the input end of the second optical splitting device into the second drop signal and the express signal, wherein the second drop signal is output from the first output end of the second optical splitting device, and the express signal enters the input end of the second coupler through the second output end of the second optical splitting device; and the second coupler processes the express signal that enters the second coupler into a first express signal and a second express signal, wherein the first express signal and the second express signal are the same as the express signal, the first express signal is output from the first output end of the second coupler, and the second express signal is output from the second output end of the second coupler.

2. The optical add-drop multiplexer according to claim 1, wherein the optical processing component further comprises an optical attenuator, wherein an input end of the optical attenuator is connected to the first output end of the second optical splitting device, and an output end of the optical attenuator serves as the first output end of the optical processing component.

3. An optical add-drop multiplexer, comprising:

an optical processing component, a first combining device, a second combining device, and a second scrambler, wherein the optical processing component comprises an input end, a first output end, a second output end, and a third output end; the first combining device comprises a first input end, a second input end, and an output end; and the second combining device comprises a first input end, a second input end, and an output end;

the first output end of the optical processing component is connected to the first input end of the second combining device, and the second output end of the optical processing component is connected to an input end of the second scrambler; an output end of the second scrambler is connected to the second input end of the second combining device; and the third output end of the optical processing component is connected to the first input end of the first combining device; and trunk signals comprising an express signal and a drop signal enter the optical processing component from the input end of the optical processing component, and the optical processing component processes the trunk signals into a second drop signal, a first express signal, and a second express signal, wherein the first express signal and the second express signal are the same as the express signal, and the second drop signal is the same as the drop signal; the second drop signal enters the first input end of the second combining device through the first output end of the optical processing component; the first express signal enters the input end of the second scrambler through the second output end of the optical processing component, the second scrambler scrambles the first express signal that enters the input end of the second scrambler to obtain a scrambled express signal, and the scrambled express signal enters the second input end of the second combining device through the output end of the second scrambler; the second combining device combines the second drop signal that enters the first input end of the second combining device and the scrambled express signal that enters the second input end of the second combining device, and then outputs a second combined signal at the output end of the second combining device; and, the second express signal enters the first input end of the first combining device through the third output end of the optical processing component, and the first combining device combines the second express signal that enters the first input end of the first combining device and an add signal that is from a branch adding port of the optical add-drop multiplexer and enters the second input end of the first combining device, and then outputs a first combined signal at the output end of the first combining device, wherein the optical processing component further comprises a fourth output end, the first combining device further comprises a third input end, and the optical add-drop multiplexer further comprises a first scrambler, wherein the fourth output end of the optical processing component is connected to an input end of the first scrambler, and an output end of the first scrambler is connected to the third input end of the first combining device;

the optical processing component further processes the drop signal that is in the trunk signals and enters the optical processing component into a first drop signal, wherein the first drop signal is the same as the drop signal; the first drop signal enters the first scrambler through the fourth output end of the optical processing component; the first scrambler scrambles the first drop signal that enters the first scrambler to obtain a scrambled first drop signal; and the scrambled first drop signal enters the third input end of the first combining device through the output end of the first scrambler; and the first combining device further connects the first input end of the first combining device and the third input end of the first combining device to the output end of the first combining device; and the express signal that enters the first input end of the first combining device and the scrambled first drop signal that enters the third input end of the first combining device are output from the output end of the first combining device.

4. The optical add-drop multiplexing branching unit according to claim 3, wherein the optical processing component comprises a third optical splitting device, a fourth coupler, and a fifth coupler, wherein an input end of the third optical splitting device is a trunk input end, the third optical splitting device comprises two output ends, a first output end of the third optical splitting device is connected to an input end of the fourth coupler, and a second output end of the third optical splitting device is connected to an input end of the fifth coupler; the fourth coupler comprises a first output end and a second output end, and the fifth coupler comprises a first output end and a second output end; the first output end of the fourth coupler is connected, as the third output end of the optical processing component, to the first input end of the first combining device; the second output end of the fourth coupler is connected, as the second output end of the optical processing component, to the input end of the second scrambler; the first output end of the fifth coupler is connected, as the fourth output end of the optical processing component, to the first scrambler; the second output end of the fifth coupler is connected, as the first output end of the optical processing component, to the first input end of the second combining device; the output end of the first combining device is a trunk output end; and the output end of the first scrambler is connected to the third input end of the first combining device; and the trunk signals comprising the express signal and the drop signal enter the third optical splitting device from the input end of the third optical splitting device, the third optical splitting device splits the trunk signals into the express signal and the drop signal, the express signal enters the input end of the fourth coupler through the first output end of the third optical splitting device, and the drop signal enters the input end of the fifth coupler through the second output end of the third optical splitting device; the fourth coupler processes the express signal that enters the input end of the fourth coupler into the first express signal and the second express signal, wherein the first express signal and the second express signal are the same as the express signal; the first express signal enters the first input end of the first combining device through the first output end of the fourth coupler, and the second express signal enters the input end of the second scrambler through the second output end of the fourth coupler; the fifth coupler processes the drop signal that enters the input end of the fifth coupler into the first drop signal and the second drop signal, wherein the first drop signal and the second drop signal are the same as the drop signal; and the first drop signal enters the input end of the first scrambler through the first output end of the fifth coupler, and the second drop signal enters the first input end of the second combining device through the second output end of the fifth coupler.

5. The add-drop multiplexing branching unit according to claim 3, wherein branch signals comprise a loading signal and an add signal, the add-drop multiplexing branching unit further comprises a fourth optical splitting device, and the first combining device further comprises a fourth input end, wherein a first output end of the fourth optical splitting device is connected to the fourth input end of the first combining device, and a second output end of the fourth optical splitting device is connected to the second input end of the first combining device;

the branch signals comprising the loading signal and the add signal enter the fourth optical splitting device from an input end of the fourth optical splitting device, the fourth optical splitting device splits the branch signals that enter the fourth optical splitting device into the loading signal and the add signal, the loading signal enters the fourth input end of the first combining device through the first output end of the fourth optical splitting device, and the add signal enters the a second input end of the first combining device through the second output end of the fourth optical splitting device; and the first combining device further connects the second input end and the fourth input end to the output end of the first combining device, and a loading signal that enters the fourth input end of the first combining device and an add signal that enters the second input end of the first combining device are output from the output end of the first combining device.

6. The optical add-drop multiplexer according to claim 3, wherein:

the first scrambler or the second scrambler is a ring oscillator.

7. The optical add-drop multiplexer according to claim 6, wherein:

the ring oscillator comprises at least one 2*2 coupler; if the ring oscillator is formed by at least two 2*2 couplers, the at least two 2*2 couplers are connected in a series connection or parallel connection manner; and if the ring oscillator is formed by at least three 2*2 couplers, the at least three 2*2 couplers are connected in a series connection manner, a parallel connection manner, or a series connection and parallel connection manner.

8. The optical add-drop multiplexer according to claim 7, wherein:

a split ratio of the at least one 2*2 coupler is $$\frac{3-\sqrt{5}}{2}.$$

9. An optical add-drop multiplexer, comprising:

an optical processing component, a first combining device, a second combining device, and a second scrambler, wherein the optical processing component comprises an input end, a first output end, a second output end, and a third output end; the first combining device comprises a first input end, a second input end, and an output end; and the second combining device comprises a first input end, a second input end, and an output end;

the first output end of the optical processing component is connected to the first input end of the second combining device, and the second output end of the optical processing component is connected to an input end of the second scrambler; an output end of the second scrambler is connected to the second input end of the second combining device; and the third output end of the optical processing component is connected to the first input end of the first combining device; and trunk signals comprising an express signal and a drop signal enter the optical processing component from the input end of the optical processing component, and the optical processing component processes the trunk signals into a second drop signal, a first express signal, and a second express signal, wherein the first express signal and the second express signal are the same as the express signal, and the second drop signal is the same as the drop signal; the second drop signal enters the first input end of the second combining device through the first output end of the optical processing component the first express signal enters the input end of the second scrambler through the second output end of the optical processing component, the second scrambler scrambles the first express signal that enters the input end of the second scrambler to obtain a scrambled express signal, and the scrambled express signal enters the second input end of the second combining device through the output end of the second scrambler; the second combining device combines the second drop signal that enters the first input end of the second combining device and the scrambled express signal that enters the second input end of the second combining device, and then outputs a second combined signal at the output end of the second combining device; and, the second express signal enters the first input end of the first combining device through the third output end of the optical processing component, and the first combining device combines the second express signal that enters the first input end of the first combining device and an add signal that is from a branch adding port of the optical add-drop multiplexer and enters the second input end of the first combining device, and then outputs a first combined signal at the output end of the first combining device, the optical processing component further comprising:

a first coupler, a first optical splitting device, and a first optical selection device, wherein an input end of the first coupler serves as the input end of the optical processing component, and a first output end and a second output end of the first coupler are connected to an input end of the first optical splitting device and an input end of the first optical selection device respectively; a first output end of the first optical splitting device is the first output end of the optical processing component, and a second output end of the first optical splitting device is the second output end of the optical processing component; and an output end of the first optical selection device is the third output end of the optical processing component; and the trunk signals comprising the express signal and the drop signal enter the first coupler from the input end of the first coupler, and the first coupler separates the trunk signals into a first trunk signal and a second trunk signal, wherein the first trunk signal and the second trunk signal are the same as the trunk signals; the first trunk signal enters the input end of the first optical splitting device through the first output end of the first coupler; the first optical splitting device separates the first trunk signal that enters the input end of the first optical splitting device into the second drop signal and the express signal, wherein the second drop signal is the same as the drop signal, the second drop signal is output from the first output end of the first optical splitting device, and the express signal is output from the second output end of the first optical splitting device; and the second trunk signal enters the input end of the first optical selection device through an output end of the first coupler, the first optical selection device blocks the second drop signal in the trunk signals to obtain the express signal, and the obtained express signal is output from the output end of the first optical selection device, wherein the first optical splitting device is a wavelength division multiplexer or a 1*2 wavelength selective switch; and the first optical selection device is a band block filter or a wavelength blocker, the optical add-drop multiplexer further comprising: a first optical amplifier, a second optical amplifier, a second optical selection device, a control unit, a first detecting device, and a second detecting device, wherein the first optical amplifier is connected in series before the input end of the optical processing component, and an output end of the first optical amplifier is connected to the optical processing component; and an output end of the second optical amplifier is connected to an input end of the second optical selection device, an output end of the second optical selection device is connected to an input end of the second detecting device, and an output end of the second detecting device is connected to the second input end of the first combining device;

a trunk signal enters the first optical amplifier from an input end of the first optical amplifier, and enters the input end of the optical processing component through the output end of the first optical amplifier; the branch signals comprising the loading signal and the add signal enter the second optical amplifier from an input end of the second optical amplifier, and enter the input end of the second optical selection device through the output end of the second optical amplifier; the input end of the second optical selection device blocks the loading signal that is in the branch signals and enters the second optical selection device from the input end of the second optical selection device, to obtain the add signal; and the obtained add signal enters the second input end of the first combining device through the output end of the second optical selection device; and the first detecting device detects an express signal that passes through the first detecting device, and sends a first detection value to the control unit; the control unit adjusts, according to the first detection value, an amplification gain of the first optical amplifier to compensate for an insertion loss of the optical add-drop multiplexer; the second detecting device detects an add signal that passes through the second detecting device, and sends a second detection value to the control unit; and the control unit adjusts, according to the second detection value, an amplification gain of the second optical amplifier to compensate for an insertion loss of the optical add-drop multiplexer.

10. The add-drop multiplexing branching unit according to claim 9, further comprising a first band block filter or a first wavelength blocker, wherein the first band block filter or the first wavelength blocker is connected in series between the optical processing component and the first input end of the first combining device, and is configured to block a drop signal among express signals that passes through the first band block filter or the first wavelength blocker.

11. The optical add-drop multiplexer according to claim 9, wherein the first optical splitting device is a 1*2 wavelength selective switch, and both the first optical selection device and the second optical selection device are wavelength blockers; and the control unit is further separately connected to the first optical splitting device, the first optical selection device, and the second optical selection device.

12. The optical add-drop multiplexer according to claim 9, wherein the first detecting device comprises a third coupler and an optical detector, wherein the third coupler is connected in series between the optical processing component and the first input end of the first combining device, an input end of the third coupler is connected to the optical processing component, and two output ends of the third coupler are separately connected to the first input end of the first combining device, and the optical detector; and the optical detector is connected to the control unit; and an express signal that enters the third coupler through the output end of the optical processing component is split into two parts, which separately enter the first input end of the first combining device, or the optical detector through the two output ends of the third coupler; and the optical detector detects an express signal that enters the optical detector from an input end of the optical detector, and sends the first detection value to the control unit.

* * * * *